United States Patent
Park et al.

(10) Patent No.: US 9,753,634 B2
(45) Date of Patent: Sep. 5, 2017

(54) MOBILE TERMINAL AND CONTROLLING METHOD THEREOF

(71) Applicant: LG ELECTRONICS INC., Seoul (KR)

(72) Inventors: Mihyun Park, Seoul (KR); Hyewon Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 300 days.

(21) Appl. No.: 14/599,304

(22) Filed: Jan. 16, 2015

(65) Prior Publication Data

US 2016/0018965 A1    Jan. 21, 2016

(30) Foreign Application Priority Data

Jul. 17, 2014    (KR) .................. 10-2014-0090494

(51) Int. Cl.
| | | |
|---|---|---|
| G06F 13/00 | (2006.01) | |
| G06F 15/00 | (2006.01) | |
| G06F 3/0486 | (2013.01) | |
| G06F 3/0488 | (2013.01) | |
| G06F 3/0483 | (2013.01) | |
| G06F 3/0485 | (2013.01) | |
| G06F 3/0484 | (2013.01) | |

(52) U.S. Cl.
CPC .......... *G06F 3/0486* (2013.01); *G06F 3/0483* (2013.01); *G06F 3/0488* (2013.01); *G06F 3/04847* (2013.01); *G06F 3/04855* (2013.01)

(58) Field of Classification Search
CPC .................................. G06F 3/048; G06F 3/01
USPC .......................... 715/702, 776, 804, 763–765
See application file for complete search history.

(56) References Cited

U.S. PATENT DOCUMENTS

| | | | |
|---|---|---|---|
| 2004/0085364 A1 | 5/2004 | Keely et al. | |
| 2012/0005617 A1 | 1/2012 | Lee et al. | |
| 2012/0192068 A1 | 7/2012 | Migos et al. | |
| 2012/0240074 A1* | 9/2012 | Migos ................... | G06F 3/0483 715/776 |
| 2013/0002585 A1* | 1/2013 | Jee ........................ | G06F 3/0488 345/173 |

(Continued)

FOREIGN PATENT DOCUMENTS

| | | |
|---|---|---|
| EP | 2323358 | 5/2011 |
| KR | 10-2012-0034539 | 4/2012 |

(Continued)

OTHER PUBLICATIONS

European Patent Office Application Serial No. 15152262.0, Search Report dated Dec. 2, 2015, 8 pages.

*Primary Examiner* — Kevin Nguyen
(74) *Attorney, Agent, or Firm* — Lee, Hong, Degerman, Kang & Waimey

(57) ABSTRACT

A mobile terminal and controlling method thereof are disclosed, by a user's reading history for the e-book content can be outputted through the progress bar. The present invention includes a display unit configured to display an e-book content and a controller, if a preset user input is received while a prescribed page of the e-book content is displayed, controlling a progress bar indicating a position of the prescribed page in a total amount of the e-book content to be outputted, the controller controlling a user's reading history for the e-book content to be outputted through the progress bar.

19 Claims, 38 Drawing Sheets

(56) References Cited

U.S. PATENT DOCUMENTS

2013/0268847 A1  10/2013  Kim et al.

FOREIGN PATENT DOCUMENTS

KR  10-2012-0034541  4/2012
KR  10-2012-0034542  4/2012

* cited by examiner

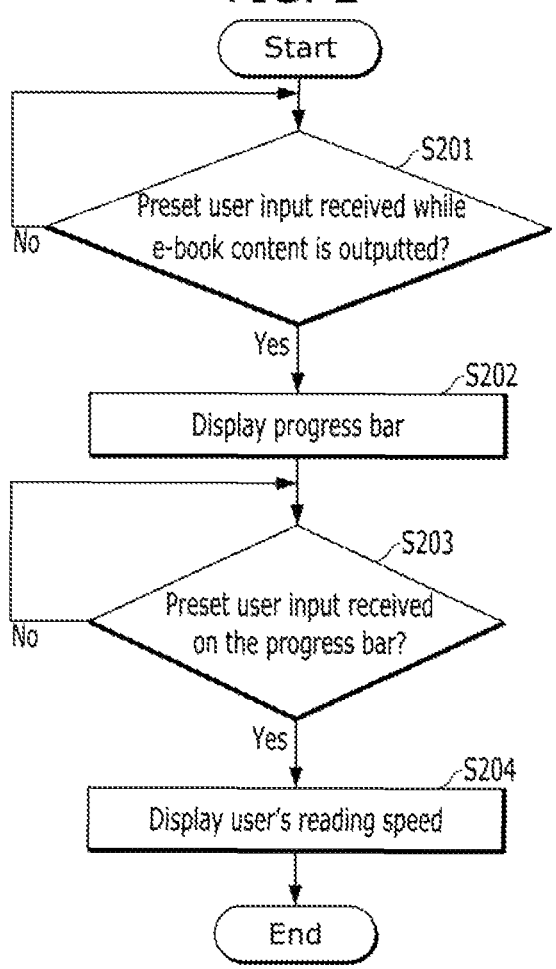

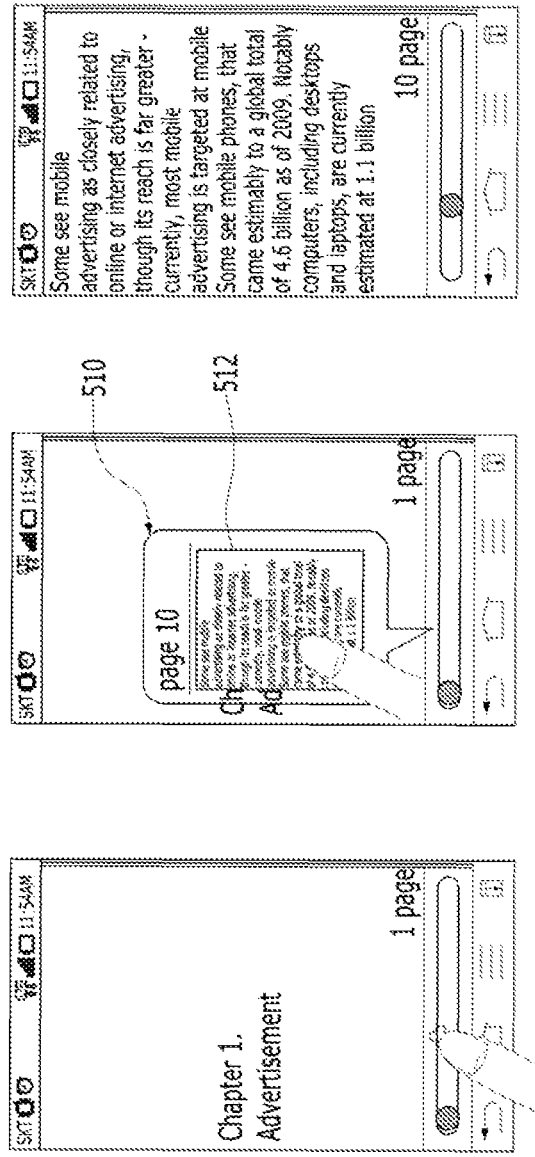

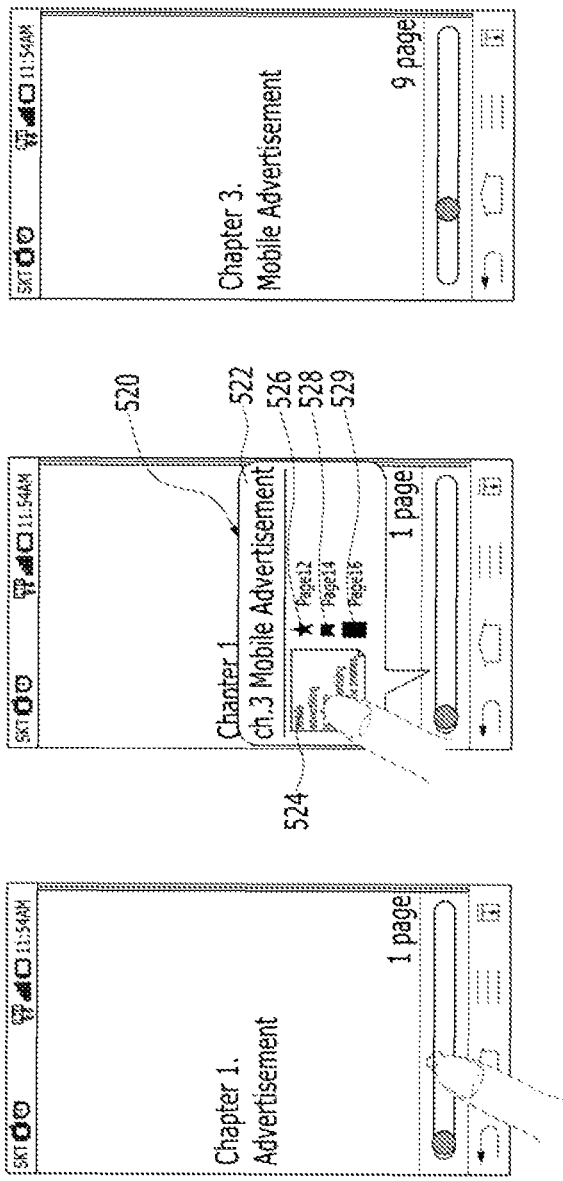

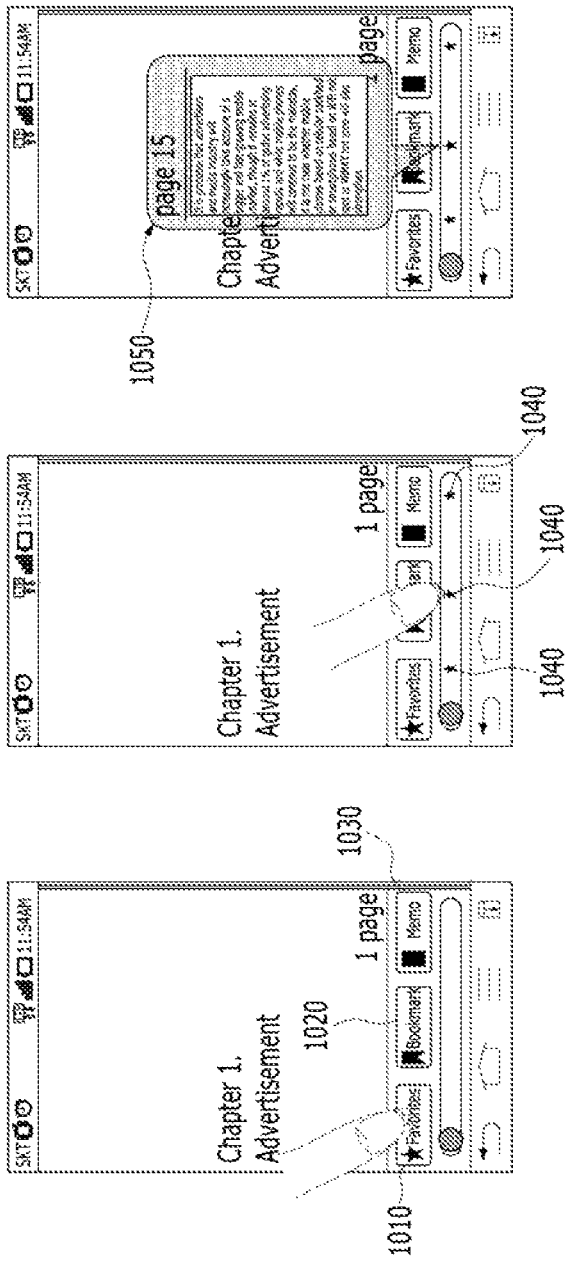

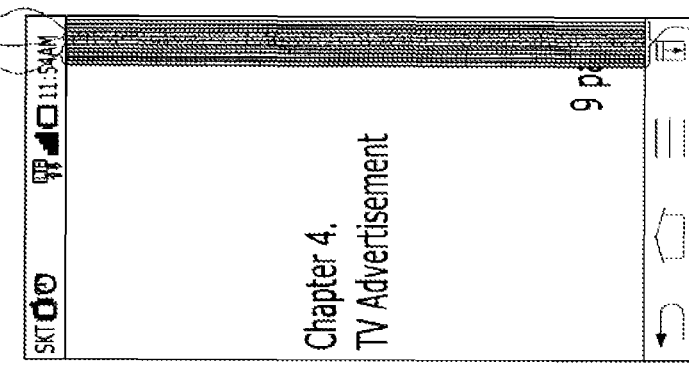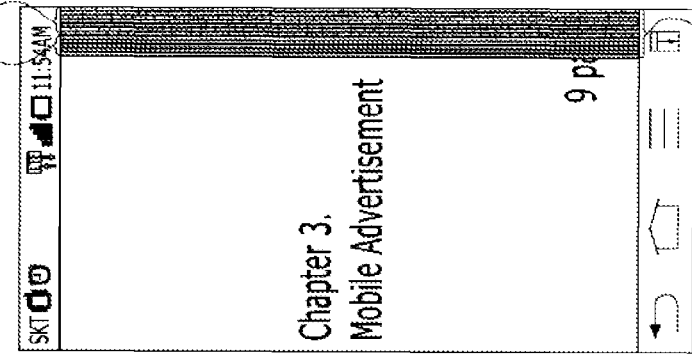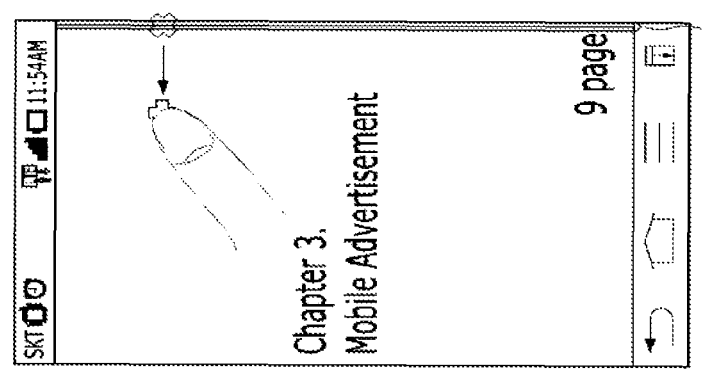

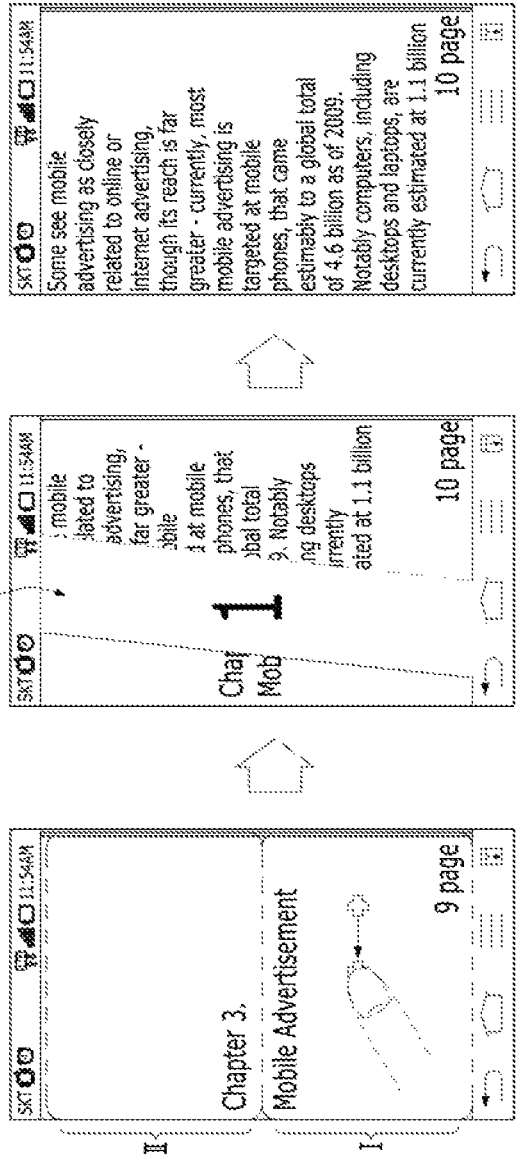

Read-only mode

Memo view mode
- first memo output

Memo view mode
- second memo output

Edit mode

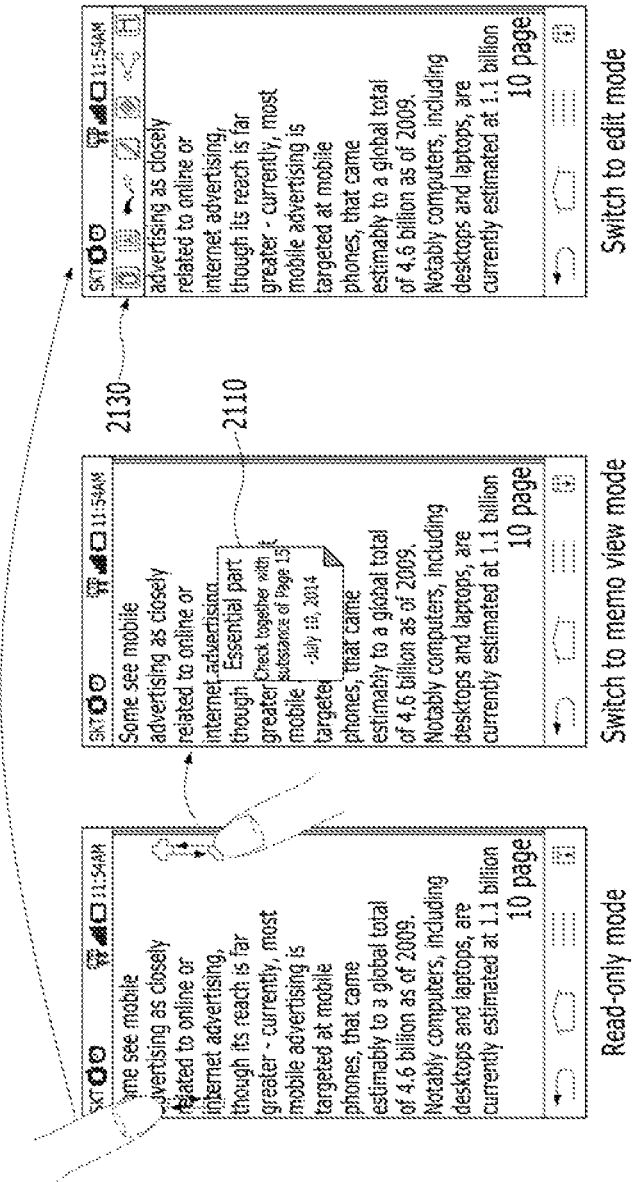

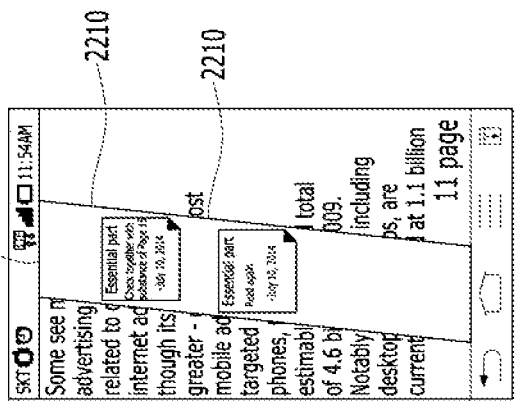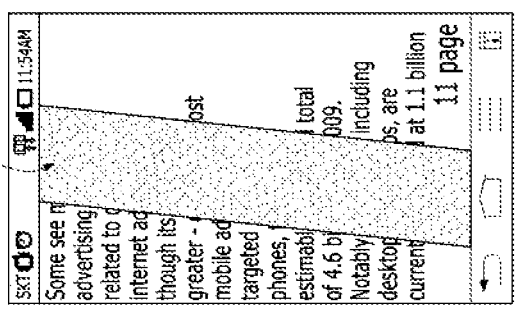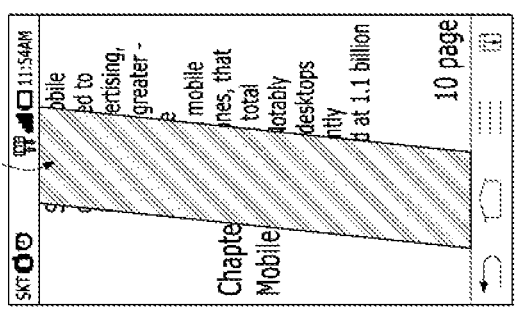

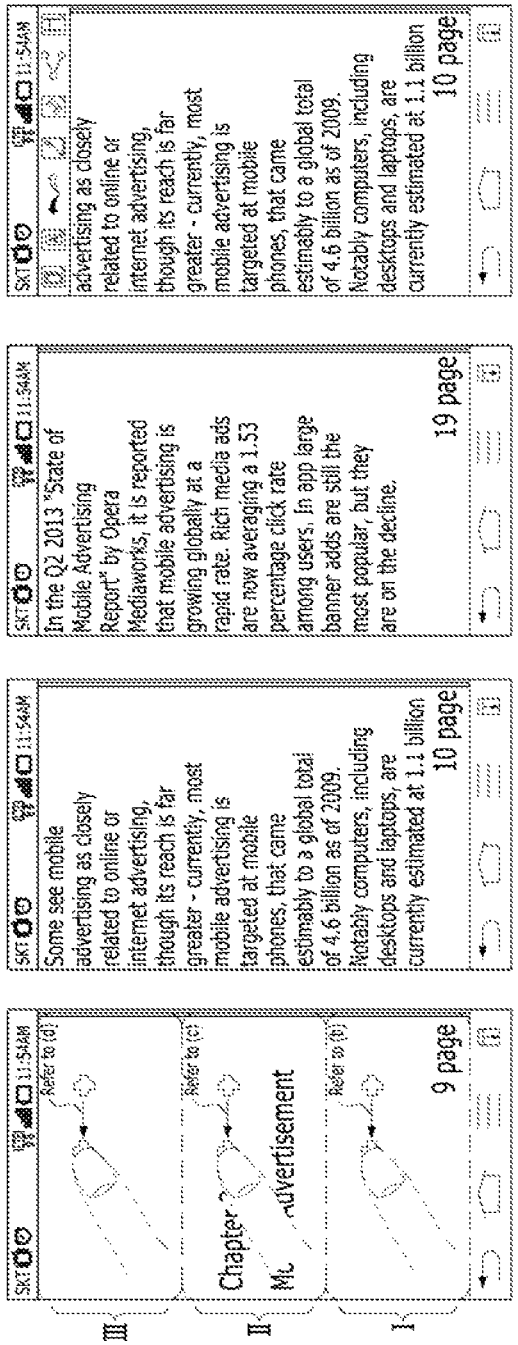

MOBILE TERMINAL AND CONTROLLING METHOD THEREOF

Pursuant to 35 U.S.C. §119(a), this application claims the benefit of earlier filing date and right of priority to Korean Application No. 10-2014-0090494, filed on Jul. 17, 2014, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for outputting a reading history of an e-book content through a progress bar.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, a mobile terminal is utilized as a device for appreciating an e-book content. In case that an e-book content is run in a mobile terminal, it is advantageous in reading a book more stereoscopically than reading a conventional paper book. For instance, a user can appreciate various images and music materials in association with a book content through such a file attached to an e-book content as a music file, a video file and the like.

In case of appreciating a general paper book, a user can be aware of a currently appreciated portion of the paper book based on a thickness of a read portion of the paper book and a thickness of an unread portion of the paper book. Hence, the user can schematically estimate a time, which will be taken to completely read an unappreciated portion of the paper book, based on the thickness of the unread portion.

However, in case of appreciating an e-book content, since it is unable to confirm a thickness of a read portion of a paper book and a thickness of an unread portion of the paper book, it is difficult to estimate a remaining unappreciated portion of the e-book content.

Therefore, the present invention intends to disclose a mobile terminal capable of providing a user with information on an unappreciated portion of an e-book content, information on a time taken to completely read the unappreciated portion of the e-book content and the like.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which information on an unappreciated portion of an e-book content, information on a time taken to completely read the unappreciated portion and the like can be provided.

Another object of the present invention is to provide a mobile terminal and controlling method thereof, by which essential information of each page can be displayed.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display unit configured to display an e-book content and a controller, if a preset user input is received while a prescribed page of the e-book content is displayed, controlling a progress bar indicating a position of the prescribed page in a total amount of the e-book content to be outputted, the controller controlling a user's reading history for the e-book content to be outputted through the progress bar.

In another aspect of the present invention, a method of controlling a mobile terminal according to another embodiment of the present invention may include the steps of outputting a prescribed page of an e-book content, if a preset user input is received while the prescribed page is displayed, outputting a progress bar indicating a position of the prescribed page in a total amount of the e-book content, and outputting a user's reading history for the e-book content through the progress bar.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a flowchart for an operation of a mobile terminal according to one embodiment of the present invention;

FIGS. 5A, 5B, 5C, 5D, 5E and 5F are diagrams for examples of outputting a page information and a chapter information, respectively;

FIGS. 10A, 10B and 10C are diagrams for one example of outputting information on a favorites registered page, a bookmarked page, or a memo inserted page to a progress bar;

FIGS. 15A, 15B and 15C are diagrams for one example of outputting a lateral image;

FIGS. 20A, 20B, 20C, 20D, 20E and 20F are diagrams for examples of determining the number of pages to turn in response to a position of a drag input;

FIGS. 21A, 21B, 21C, 21D, 21E, 21F and 21G are diagrams to describe a read mode of a mobile terminal;

FIGS. 22A, 22B and 22C are diagrams for one example of outputting information indicating whether a memo is inserted in a specific page to a back of the specific page;

FIGS. 24A, 24B, 24C and 24D are diagrams for one example of applying the former embodiments described with reference to FIG. 20 and FIG. 23 together;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
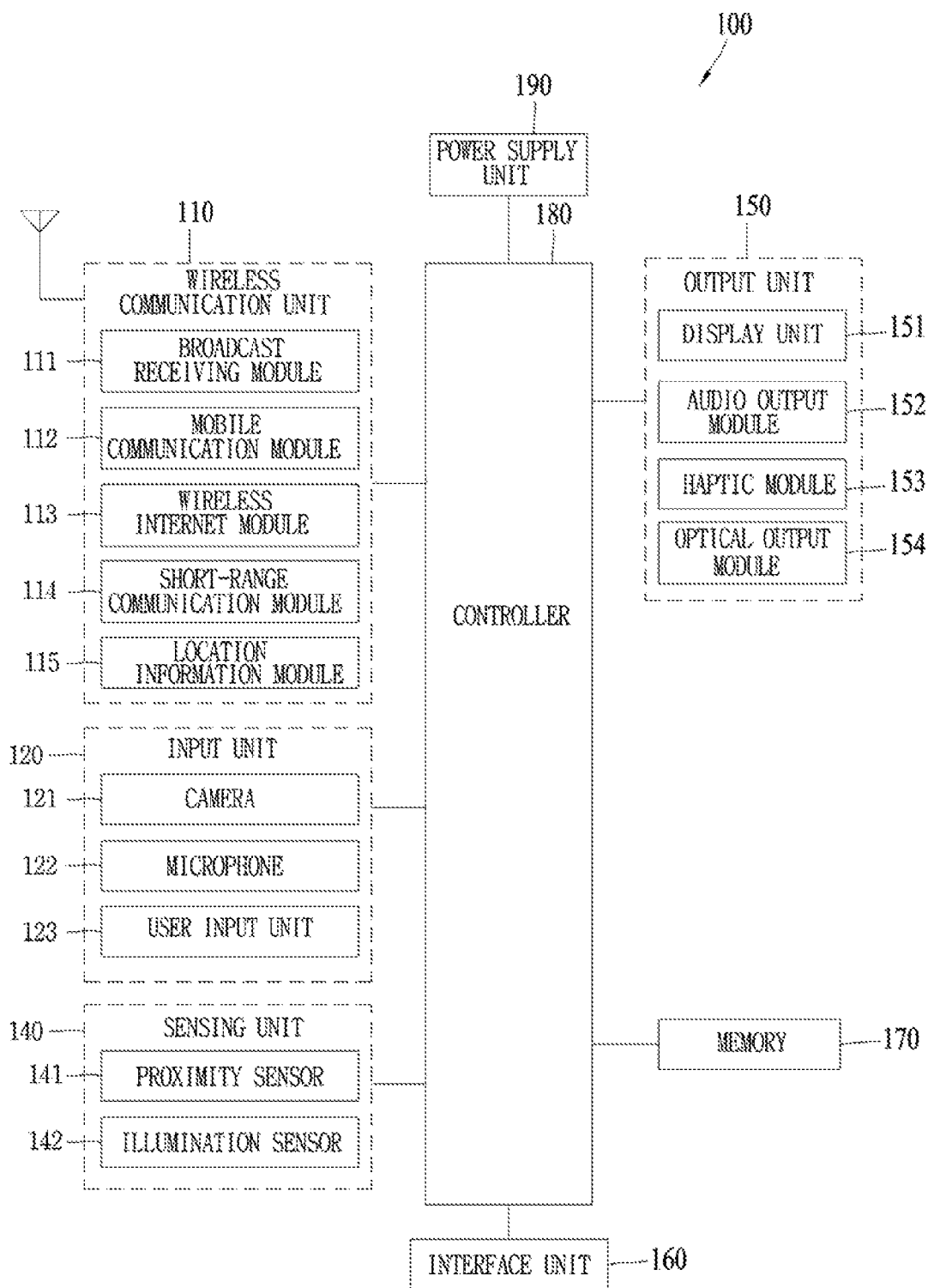
FIG. 1A is a block diagram of a mobile terminal in accordance with the present disclosure.
Figure 1B:
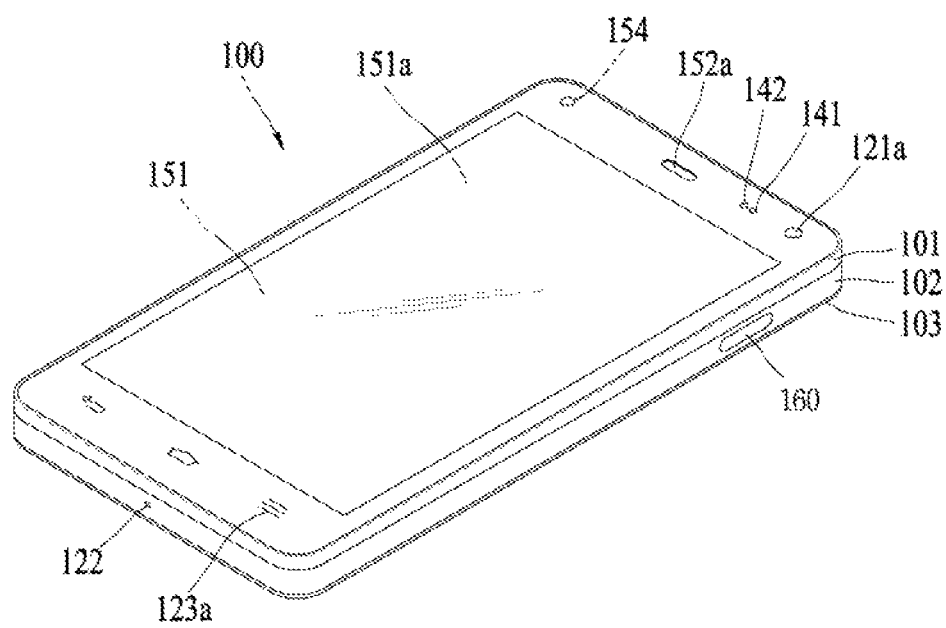
FIGS. 1B and 1C are conceptual views of one example of the mobile terminal, viewed from different directions.
Figure 1C:
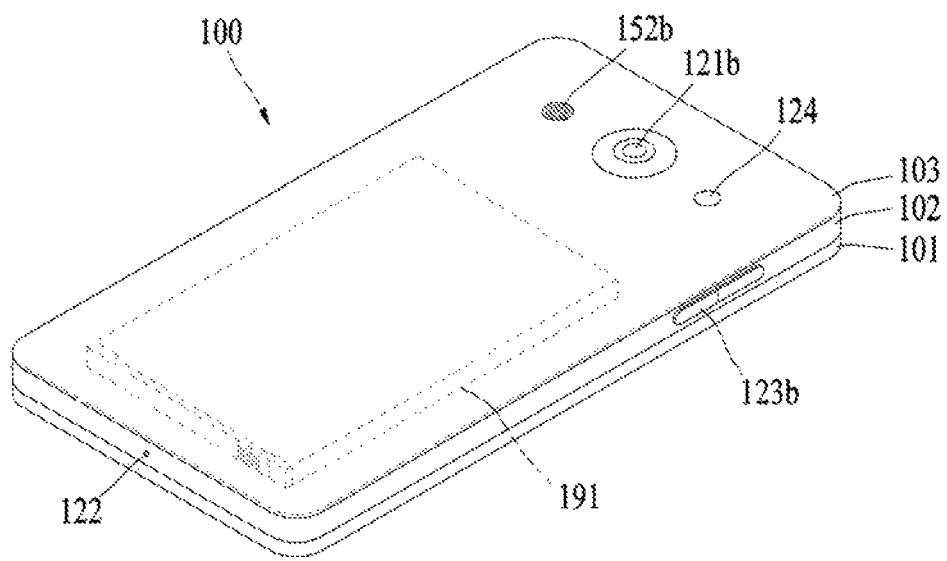

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units

123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be movable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity and convenience of the following description, assume that the mobile terminal 100 according to the present invention includes at least one of the components shown in FIGS. 1A to 1C. For instance, assume that the mobile terminal 100 according to the present invention includes the display unit 151, the memory 170 and the controller 180.

If the display unit 151 of the mobile terminal 100 according to the present invention includes a touchscreen, implementation of the following embodiments may be further facilitated. If the display unit 151 does not include the touchscreen, touch inputs in the following embodiments can be substituted with an action of pushing a button externally exposed on the mobile terminal 100, a gesture input through the mobile terminal 100, and the like.

In the following description, the mobile terminal 100 according to the present invention is explained in detail with reference to the accompanying drawings. p FIG. 2 is a flowchart for an operation of a mobile terminal according to one embodiment of the present invention.

Referring to FIG. 2, while an e-book content is running, if a preset user input is received [S201], the controller 180 can output a progress bar that indicates a position of a currently outputted page included in the entire portions of the e-book content [S202].

Figure 3A:
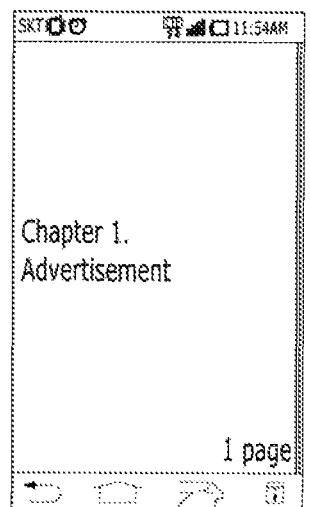
FIGS. 3A and 3B are diagrams for one example of outputting a progress bar.
Figure 3B:
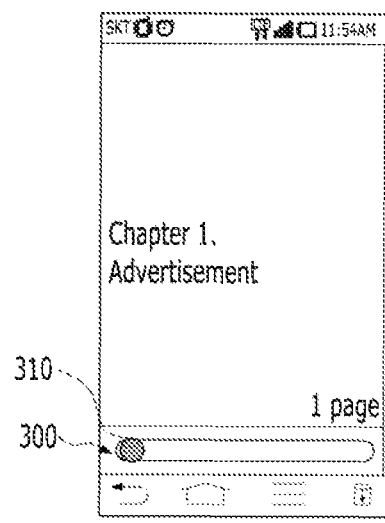

For instance, FIGS. 3A and 3B are diagrams for one example of outputting a progress bar. Referring to FIGS. 3A and 3B, while an e-book content is running, if a user input for outputting a progress bar is received [FIG. 3A], the controller 180 can control a progress bar 300, which indicates a position of a currently outputted page included in the entire pages of the e-book content, to be outputted [FIG. 3B]. Like the example shown in FIG. 3A, the progress bar is outputted in response to a touch input performed in a manner of touching a navigation button outputted through the display unit 151 while the e-book content is running. Besides, a user input for outputting the progress bar is non-limited by the touch input of the example shown in FIG. 3A.

A position indicator 310 can be displayed on the progress bar 300 to indicate a position of a currently outputted page included in the entire portions of the e-book content. After the position indicator 310 has been touched, if a user input of dragging the position indicator 310 along the progress bar 300 is received, the controller 180 changes a position of the indicator 310 to the drag point and is also able to control a page corresponding to the changed position to be outputted.

Figure 4A:
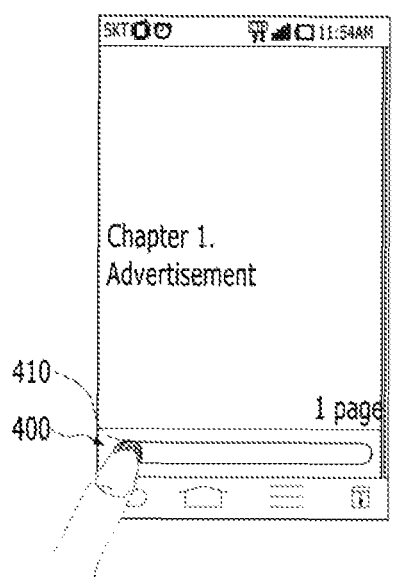
FIGS. 4A and 4B are diagrams for one example of changing a page outputted through a display unit in response to a drag movement of a position indicator.
Figure 4B:
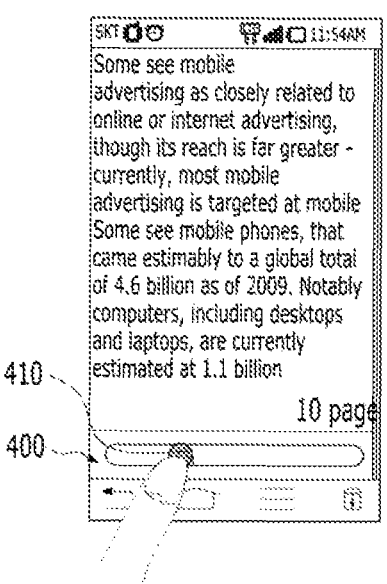

For instance, FIGS. 4A to 4D are diagrams for one example of changing a page outputted through a display unit in response to a drag movement of a position indicator. Referring to FIG. 4A and FIG. 4B, while Page 1 is outputted through the display unit 151, if a position indicator 410 moves to a position corresponding to Page 10 on the progress bar 400 (e.g., dragging and dropping the position indicator 410 onto the position corresponding to Page 10), the controller 180 can control Page 10 to be outputted through the display unit 151.

Meanwhile, if a user input of touching a remaining region on the progress bar except the region for outputting the position indicator is received, the controller 180 can control a page information corresponding to the touched position or a chapter information corresponding to the touched position to be outputted.

For instance, FIGS. 5A to 5F are diagrams for examples of outputting a page information and a chapter information, respectively.

Referring to FIGS. 5A to 5C, if a remaining region on a progress bar except a position indicator displayed region is touched, the controller 180 can control a page information of a page, which corresponds to the touch position, to be outputted. For instance, if a point corresponding to Page 10 on the progress bar is touched [FIG. 5A], the controller 180 can control an information 510 on the Page 10 to be displayed [FIG. 5B].

In this case, the page information may include at least one of a corresponding page number, a preview image of the corresponding page, a chapter information of a chapter having the corresponding page belong thereto, and a content of the corresponding page. If the corresponding page is already read by a user, the page information may further include a time & day of reading the corresponding page by the user, a speed of reading the corresponding page by the user, and the like. According to the example shown in FIG. 5B, a preview image 512 for the Page 10 is included in the page information 510.

If the page information currently outputted through the display unit 151 is touched, the controller 180 changes a position of the position indicator on the progress bar into a position of the page corresponding to the page information and is also able to control the page corresponding to the page information to be outputted through the display unit 151.

For instance, if the preview image 512 corresponding to the Page 10 shown in FIG. 5B is touched, like the example shown in FIG. 5C, the controller 180 can control the Page 10 to be outputted through the display unit 151.

For another instance, referring to FIGS. 5D to 5F, if a remaining region on a progress bar except a position indicator displayed region is touched, the controller 180 can control a chapter information 520, which corresponds to the touch position, to be outputted.

For example, if a point on the progress bar nearby Page 10 is touched [FIG. 5D], the controller 180 can control an information 520 on Chapter 3, in which the Page 10 is included, to be outputted [FIG. 5E].

In this case, the chapter information 520 may include at least one of a name of a corresponding chapter, start and end pages of the corresponding chapter, an introduction of the corresponding chapter, a favorites-registered page included in the corresponding chapter, a bookmarked page included in the corresponding chapter, a memo inserted page included in the corresponding chapter, and the like.

For instance, in FIG. 5E, 'Mobile Advertisement' 522 may indicate a name of Chapter 3 and a wording 524 in a box may indicate an introduction of Chapter 3. And, 3 indicators 526, 528 and 529 shown in FIG. 5E may indicate a page favorites-registered page included in a corresponding chapter, a bookmarked page included in the corresponding chapter, a memo inserted page included in the corresponding pate, respectively.

If the chapter information 520 currently outputted through the display unit 151 is touched, the controller 180 changes a position of the position indicator on the progress bar into a start point of the chapter and is also able to control a start page of the corresponding chapter to be outputted through the display unit 151.

For instance, assuming that Chapter 3 includes Page 9 to Page 15, if the chapter information 520 of the Chapter 3 shown in FIG. 5E is touched, like the example shown in FIG. 5F, the controller 180 can control Page 9, which is the start page of the Chapter 3, to be outputted through the display unit 151.

For another instance, if the chapter information is touched, the controller 180 can control a bookmarked (or favorites-registered) page in the corresponding chapter to be outputted or can control a memo-inserted page in the corresponding chapter to be outputted.

In case that an e-book content includes a considerable amount of portions, it is difficult for a user to select a desired page through a progress bar. Hence, if a user touches a progress bar, the controller 180 can display the progress bar by zooming in on a portion of the progress bar.

Figure 6:
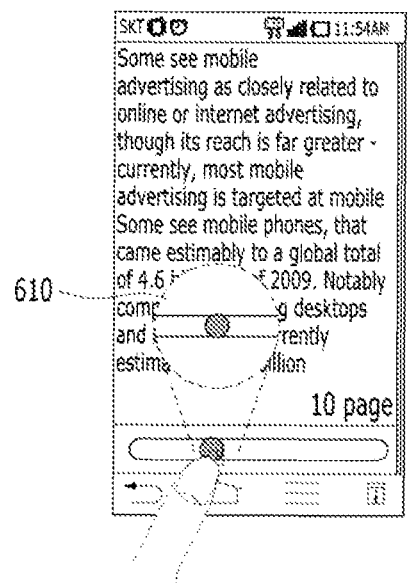
FIG. 6 is a diagram for one example of displaying a progress bar by zooming in on a portion of the progress bar.

For instance, FIG. 6 is a diagram for one example of displaying a progress bar by zooming in on a portion of the progress bar.

Referring to FIG. 6, if a user input of touching a prescribed position on a progress bar over prescribed duration is received, the controller 180 can control an enlarged progress bar 610 to be displayed in a manner that a partial section, which is set centering of a user's touch point, of the progress bar to be outputted. Through the enlarged progress bar, the user can select a desired page more accurately.

As mentioned in the foregoing description with reference to FIGS. 4A and 4B, if a position indicator is moved along a progress bar, a page corresponding to a moved position of the position indicator can be outputted. In doing so, when the position indicator is moved, as mentioned in the foregoing description with reference to FIGS. 5A to 5F, it is a matter of course that a page or chapter information of a page indicated by the position indicator can be outputted.

Figure 4C:
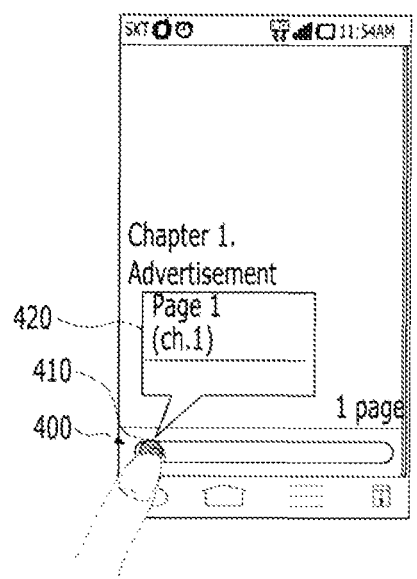
FIGS. 4C and 4D are diagrams for one example of outputting a page information on a prescribed page corresponding to a position indicator in response to a drag movement of the position indicator.
Figure 4D:
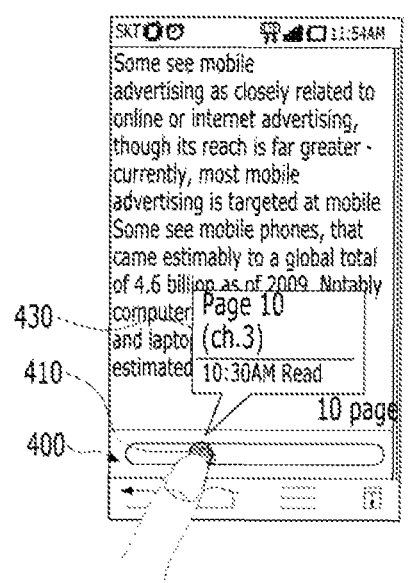

For instance, like the example shown in FIGS. 4C and 4D, if a user input of dragging the position indicator 410 on the progress bar 400 is received, the controller 180 can control a page or chapter information of a page, which corresponds to a position having the indicator dragged thereto, to be outputted. According to the example shown in FIG. 4C, page and chapter numbers of the page indicated by the position indicator 410 are outputted as page information 420/430, respectively.

If the page indicated by the position indicator is a page already read by a user, like the example shown in FIG. 4D, the controller 180 can control a time information on a time, at which the user read the corresponding page, and the like to be further outputted.

Through a progress bar, a user's reading history for reading an e-book content can be displayed. In particular, the controller 180 can output information on at least one of a user's reading speed for the e-book content, a portion of reading the e-book content, and a time taken to read the e-book content. This shall be described in detail through the following description of embodiments.

The controller 180 can display a speed for a user to read each page through a progress bar. For instance, the controller 180 controls a progress bar to be represented in a color indicating a user's reading speed, thereby displaying a speed of reading each page. In this case, the reading speed can be determined by the number of words read in a unit time. In particular, the controller 180 can calculate a user's reading speed for a specific page by dividing the total number of words contained in the specific page by a time taken to read the specific page.

For instance, the controller 180 represents a position on a progress bar corresponding to a page read by a user at a speed of a fast level in a first color, represents a position on a progress bar corresponding to a page read by a user at a speed of a middle level in a second color, and represents a position on a progress bar corresponding to a page read by a user at a speed of a slow level in a third color. Moreover, a position corresponding to a page unread or skipped by a user on a progress bar can be represented in a fourth color. When an output of the display unit 151 is changed into Page 10 from Page 5 by a user input (e.g., a user input of moving a position indicator like the example shown in FIGS. 4A and 4B) for changing an outputted page, Pages 6 to 9 between Page 5 and Page 10 can be regarded as a skipped part unread by a user.

Figure 7:
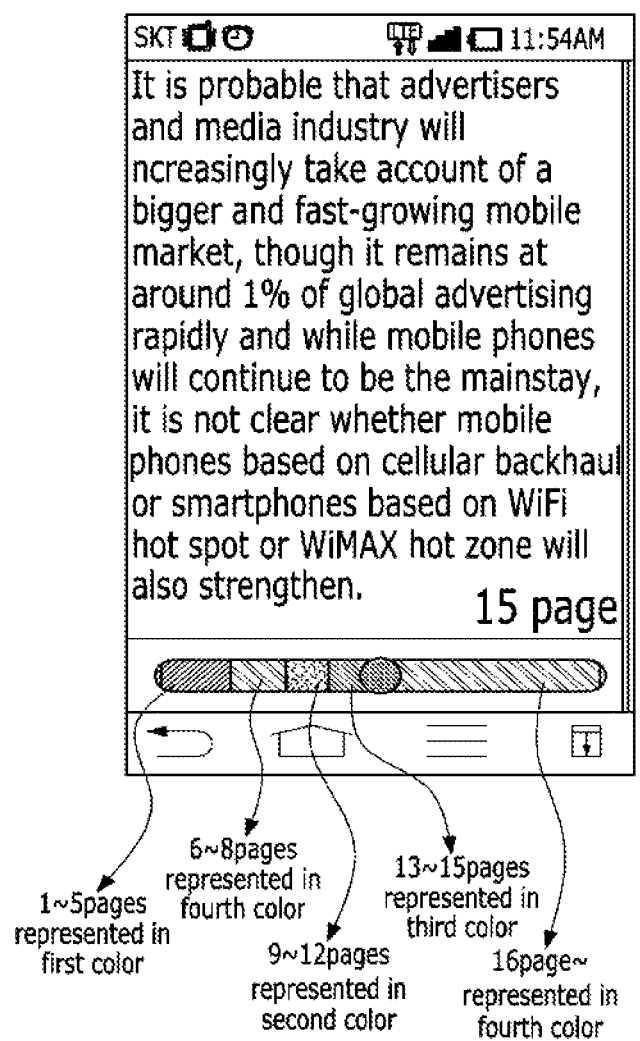
FIG. 7 is a diagram for one example of displaying a user's reading speed through a progress bar.

FIG. 7 is a diagram for one example of displaying a user's reading speed through a progress bar. For clarity of the following description, Pages 1 to 5 of an e-book content are assumed as a part read by a user at a fast speed, Pages 6 to 8 of the e-book content are assumed as a part skipped by a user, Pages 9 to 12 are assumed as a part read by a user at a speed of a middle level, Pages 13 to 15 are assumed as a part read by a user at a speed of a slow level, and Page 16 and more are assumed as a part unread by a user yet.

Referring to FIG. 7, the controller 180 controls a part corresponding to Pages 1 to 5 on a progress bar to be represented in a first color, controls a part corresponding to Pages 9 to 12 on the progress bar to be represented in a second color, and controls a part corresponding to Pages 13 to 15 on the progress bar to be represented in a third color. Hence, the controller can control a user's reading speed to be displayed through the progress bar. In addition, the controller 180 controls a part corresponding to Pages 6 to 8 unread by a user and a part corresponding to Page 16 and more unread by the user to be represented in a fourth color, thereby controlling the parts unread by the user to be identifiably displayed.

Although FIG. 7 shows one example that the part skipped by the user without being read and the part unread by the user yet are represented in the same color, it is a matter of course that the part skipped by the user without being read and the part unread by the user yet can be represented in different colors, respectively. For clarity, FIG. 7 shows one example that the user's reading speeds are discriminated into 3 levels, by which the present invention is non-limited.

Through the progress bar, the controller 180 can display such information as a user's current reading speed, a rate of a portion read by a user, a time estimated to be taken for a user to completely read a remaining portion and the like.

Figure 8A:
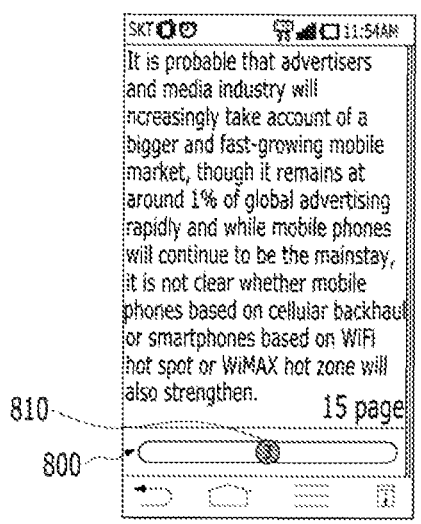
FIG. 8A is a diagram for one example of outputting a current reading speed of a user through a progress bar.

For instance, FIG. 8A is a diagram for one example of outputting a current reading speed of a user through a progress bar. For clarity of the following description, assume that a user's reading speed is categorized into one of a fast level, a middle level and a slow level. And, assume that a reading speed of a fast level, a reading speed of a middle level, and a reading speed of a slow level correspond to a numeral 3, a numeral 2, and a numeral 1, respectively.

Referring to FIG. 8A, the controller 180 can control a user's reading speed to be displayed through a position indicator 810 on a progress bar 800. According to the example shown in FIG. 8A, a numeral '3', which indicates that a user's reading speed is a fast level, is displayed on the position indicator 810. In this case, the user's reading speed may be measured in a manner of dividing the total number of words contained in a previous page by a time taken to read the previous page.

Figure 8B:
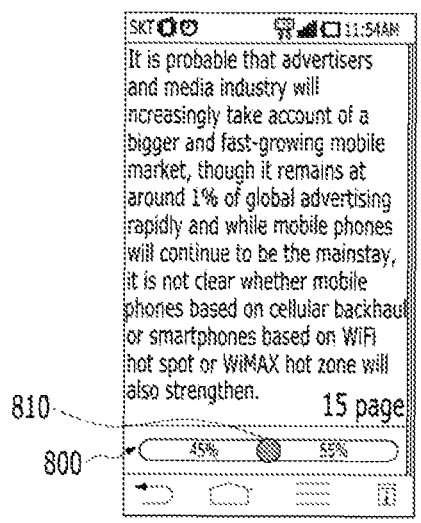
FIG. 8B is a diagram for one example of displaying a rate of a portion read by a user through a progress bar.

FIG. 8B is a diagram for one example of displaying a rate of a portion read by a user through a progress bar.

Referring to FIG. 8B, the controller 180 can control at least one of a rate of a user-read part over the total page number of an e-book content and a rate of a user-unread part over the total page number to be displayed on a progress bar 800.

Generally, on the progress bar 800, a part located in a first direction (e.g., a left side of a position indicator 810) centering on the position indicator 810 indicates a user-read part and a part located in a second direction (e.g., a right side of the position indicator 810) centering on the position indicator 810 indicates a user-unread part. Hence, the controller 180 displays a rate of the user-read part in the first direction centering on the position indicator 810 on the progress bar 800 and is also able to display a rate of the user-unread part in the second direction centering on the position indicator 810.

According to the example shown in FIG. 8B, the rate (e.g., 45%) of the user-read part is displayed on the left side of the position indicator 810 on the progress bar 800 and the rate (e.g., 55%) of the user-unread part is displayed on the right side of the position indicator 810.

Figure 8C:
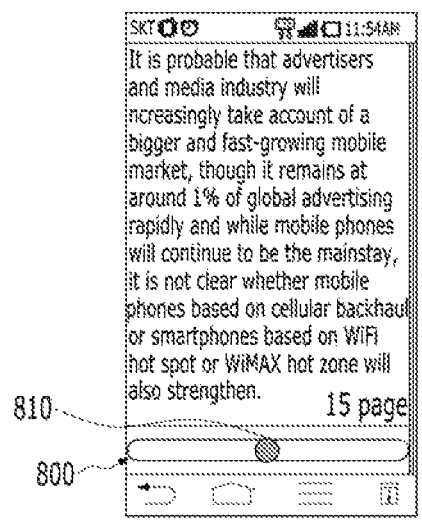
FIG. 8C is a diagram for one example of outputting a time information estimated to be taken until a user completely reads a remaining portion.

FIG. 8C is a diagram for one example of outputting a time information estimated to be taken until a user completely reads a remaining portion.

Referring to FIG. 8C, the controller 180 can control an information on a time taken to read pages up to a current page or an information on a time estimated to be taken to read remaining pages to be outputted to a progress bar 800. In this case, the time estimated to be taken to read the remaining pages can be calculated based on a user's average reading speed and the total number of words contained in the reaming pages or based on an average time for a user to read a single page and the total number of pages of a remaining part.

According to the example shown in FIG. 8C, a time taken for a user to read pages up to a current page is displayed on a left side of a position indicator 810 on a progress bar 800 and a time estimated to be taken for a user to read the remaining pages is displayed on the right side of the position indicator 810.

According to the present invention, the mobile terminal 1800 can automatically turn a page after a lapse of a prescribed time. Although a page is not automatically turned, a target time for fully reading a specific page can be set. For instance, in case that an e-book content is an exercise book, a target time for solving problem(s) contained in a specific page may be set. Hence, the controller 180 can control a remaining time until turning a page or a time remaining to a set target time to be outputted through the progress bar 800.

Figure 9A:
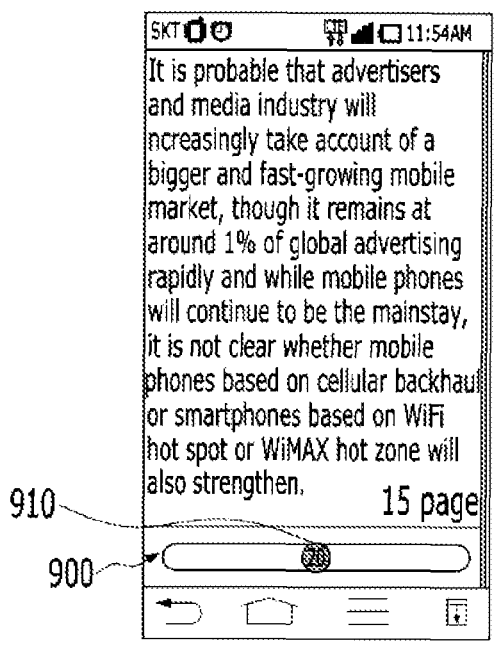
FIGS. 9A and 9B are diagrams for one example of outputting a remaining time.
Figure 9B:
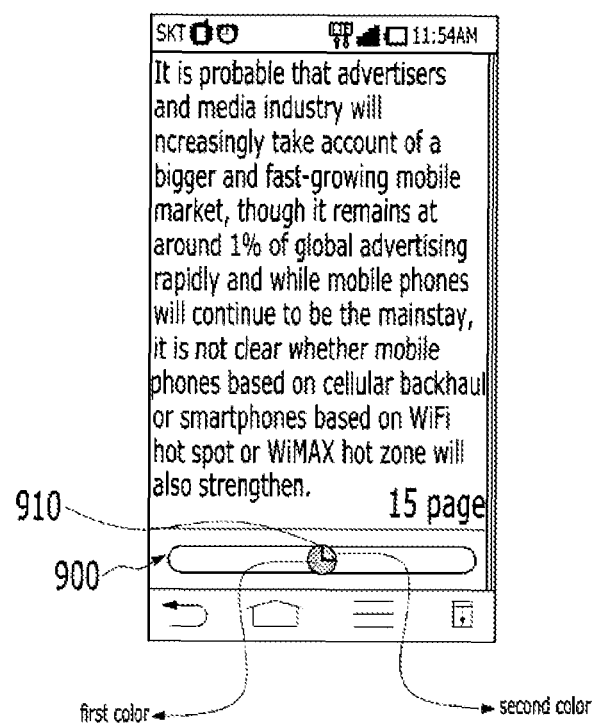

For instance, FIGS. 9A and 9B are diagrams for one example of outputting a remaining time.

Referring to FIGS. 9A and 9B, the controller 180 can control a remaining time, which remains until a currently outputted page is turned, or a remaining time, which remains until a set target time, to be outputted through a position indicator 910 on a progress bar 900.

For instance, like the example shown in FIG. 9A, the controller 180 can display a remaining time on the position indicator 910 by a unit of second. For another instance, the controller 180 represents the position indicator 910 in two colors and is able to display a remaining time in a manner of decreasing a size occupied by one of the two colors with a lapse of a time and increasing a size occupied by the other with the lapse of the time. In particular, the controller 180 initially represents the position indicator 910 in a first color. Subsequently, with a lapse of a time, the controller 180 decreases a size represented in the first color and increases a size represented in a second color. According to the example shown in FIG. 9B, a size represented in the second color gradually increases clockwise.

Besides, as a remaining time decreases, the controller 180 can control a color of a position indicator to be almost changed into a specific color [not shown in the drawing]. For instance, if a remaining time remains considerably, the controller 180 controls a position indicator to have a first color in the first place. Subsequently, as the remaining time decreases with a lapse of a time, the controller 180 can control the position indicator to have a second color gradually.

For another instance, as a remaining time decreases, the controller 180 can control a position indicator to flicker faster. In particular, if there is a considerable amount of a remaining time, the controller controls the position indicator to flicker slow (i.e., a color of the position indicator changes between a first color and a second color slowly). Subsequently, if the remaining time gradually decreases with a lapse of a time, the controller 180 can control the position indicator to flicker faster (i.e., the color of the position indicator changed between the first color and the second color faster).

The controller 180 can output information on at least one of a favorites registered page, a bookmarked page and a memo inserted page through a progress bar.

FIGS. 10A to 10C are diagrams for one example of outputting information on a favorites registered page, a bookmarked page, or a memo inserted page to a progress bar.

Referring to FIGS. 10A to 10C, through a progress bar, the controller 180 can output a button for displaying a favorites registered page, a button for displaying a bookmarked page, and a button for displaying a memo inserted page. For instance, according to the example shown in FIG. 10A, a favorites button 1010 is to identifiably display a favorites registered page on the progress bar, a bookmark button is to identifiably display a bookmarked page on the progress bar, and a memo button 1030 is to identifiably display a memo inserted page on the progress bar.

For instance, if the favorites button 1010 is touched, referring to FIG. 10B, the controller 180 can control an indicator 1040, which is provided to identify a location of a favorites registered page, to be outputted to the progress bar.

Besides, if the bookmark button is touched, the controller 180 can control an indicator, which is provided to identify a location of a bookmarked page, to be outputted to the progress bar [not shown in the drawing]. If the memo button is touched, the controller 180 can control an indicator, which is provided to identify a location of a memo inserted page, to be outputted to the progress bar [not shown in the drawing].

If the indicator 1040 on the progress bar is touched, the controller 180 can control a page or chapter information of a corresponding page to be outputted.

For instance, if the indicator 1040 for identifying a location of a favorites registered page shown in FIG. 10B is touched, like the example shown in FIG. 10C, the controller 180 can control a page information 1050 of a page indicated by the touched indicator to be outputted.

Referring now to FIG. 2, while the progress bar is outputted, if a prescribed user input is received [S203], the controller 180 can control a user's reading speed per page to be displayed [S204]. In particular, in response to the prescribed user input, the controller 180 can control a graph, which shows a user's reading speed, to be outputted.

Figure 11A:
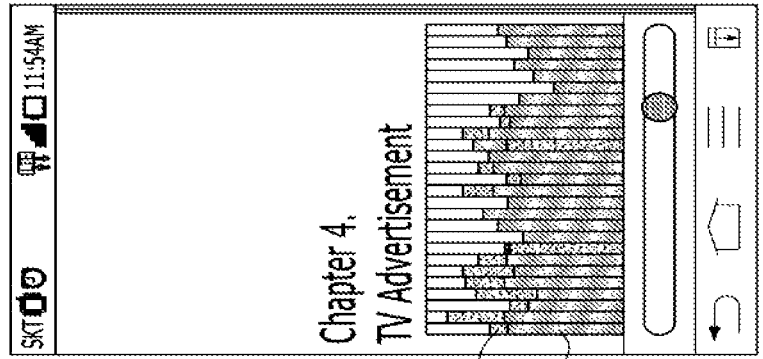
FIGS. 11A, 11B and 11C are diagrams for one example of outputting a graph indicating a user's reading speed.
Figure 11B:
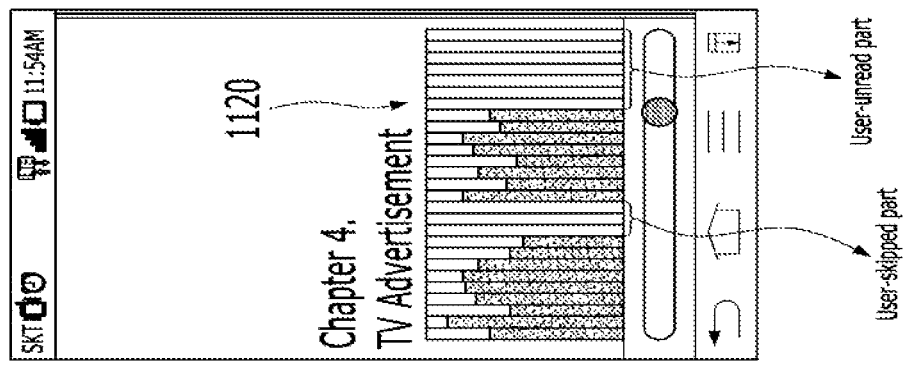
Figure 11C:
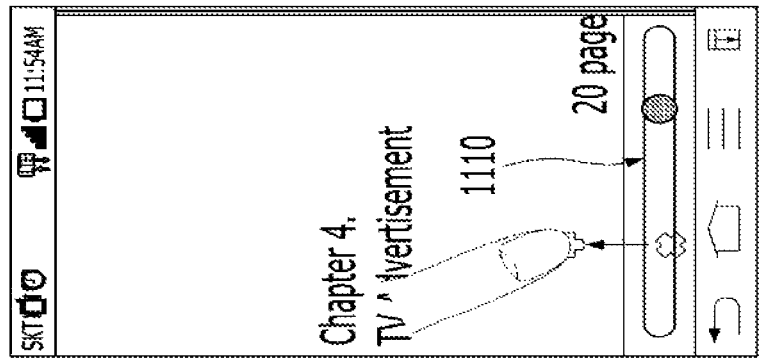

FIGS. 11A to 11C are diagrams for one example of outputting a graph indicating a user's reading speed.

Referring to FIGS. 11A to 11C, while a progress bar 1110 is outputted, if a preset user input (e.g., a user input of dragging to move a pointer currently touching a progress bar in a top direction in FIG. 11A) is received, like the example shown in FIG. 11B, the controller 180 can control a graph, which shows a reading speed for a page read by a user, to be outputted. According to the example shown in FIG. 11B, a bar graph 1120 is outputted to display a user's reading speed per page. In the bar graph 1120 shown in FIG. 11B, an x-axis may indicate a page and a y-axis may indicate a user's reading speed. In particular, each bar shown in FIG. 11B may indicate a user's reading speed for each page. If the user's reading speed gets higher, a height of the corresponding bar may increase more.

For a part skipped by a user without being read or a part unread by a user yet, like the example shown in FIG. 11B, a height of a bar can be set to 0 (i.e., a display of a bar is skipped for a part unread by a user).

In case that a user is reading an e-book content plural times, the controller 180 can control a reading speed on reading the e-book content previously to be displayed together with a reading speed on reading the e-book content currently.

For instance, like the example shown in FIG. 11C, the controller 180 can control a bar graph indicating a reading speed on reading the e-book content previously to be represented in a first color and also controls a bar graph indicating a reading speed on reading the e-book content currently to be represented in a second color, thereby controlling the two bar graphs to be identifiable from each other.

In doing so, the controller 180 can further control at least one of the bar graph indicating the previous reading speed and the bar graph indicating the current reading speed to be displayed semi-transparently. This is to prevent one of the bar graphs from blocking the other.

As mentioned in the foregoing description, the controller 180 configures a plurality of compartments amounting to the number of pages of an e-book content and displays a bar, which indicates a user's reading speed, on each of the compartments, thereby displaying the user's reading speed. In doing so, the controller 180 can control additional information per page to be further outputted to a bar graph.

In this case, the additional information may include an information indicating whether a memo is inserted in a corresponding page, an information indicating whether a corresponding page is favorites-registered, an information indicating whether a corresponding page is bookmarked, an information indicating whether a corresponding page is currently outputted, and the like.

Figure 12A:
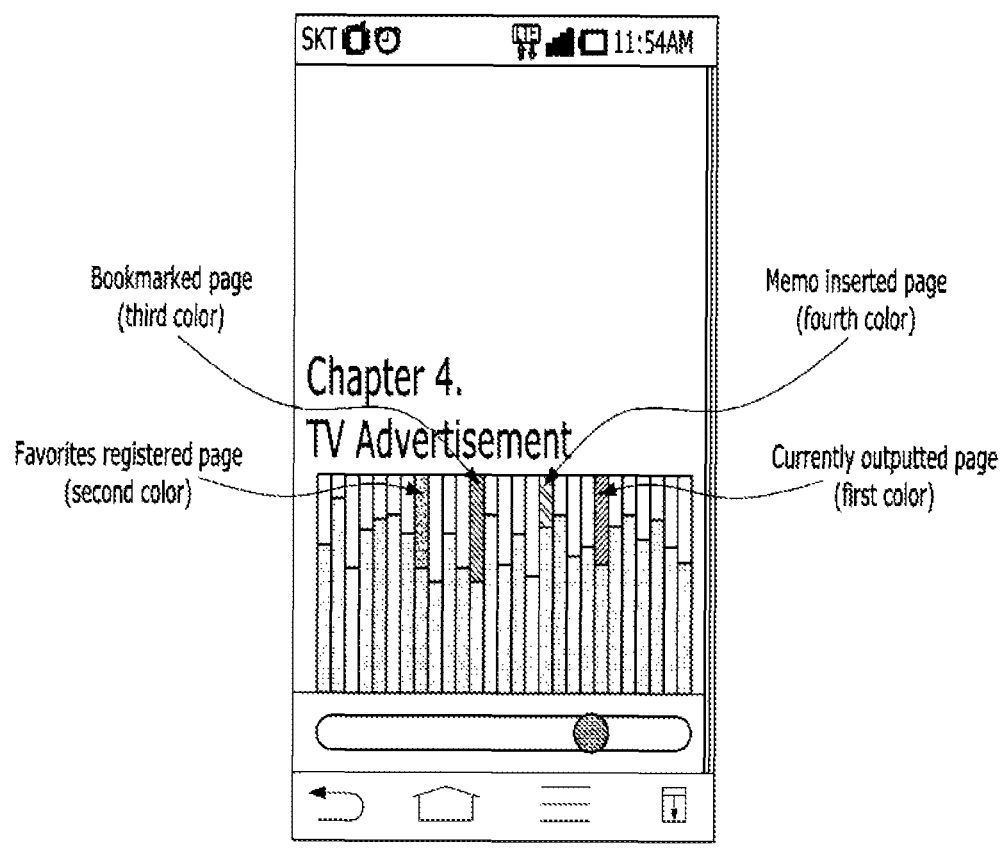
FIGS. 12A and 12B are diagrams for examples of outputting additional information through a bar graph.
Figure 12B:
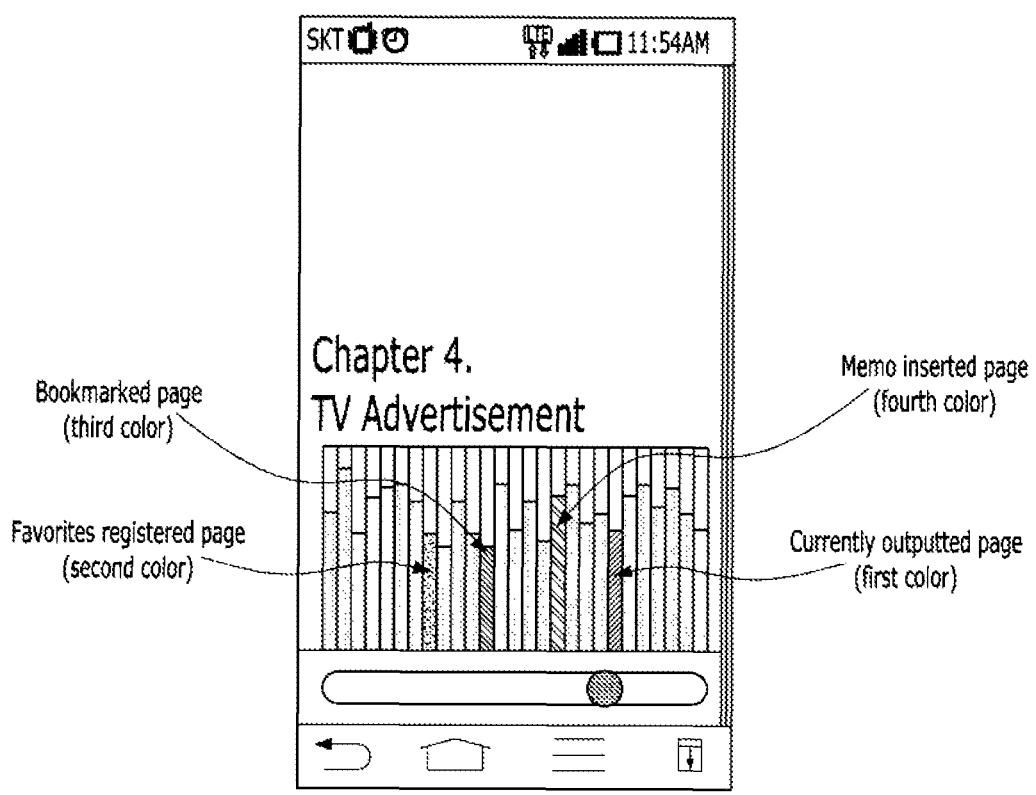

FIGS. 12A and 12B are diagrams for examples of outputting additional information through a bar graph.

Referring to FIG. 12A and FIG. 12B, the controller 180 can display a user's reading speed for a specific page by adjusting a height of a bar. In particular, if a user's reading speed for a specific page is fast, the controller 180 controls a height of a bar to be raised. If a user's reading speed for a specific page is slow, the controller 180 controls a height of a bar to be lowered.

In doing so, if the height of the bar is smaller than that of a bar inserted compartment, a partial region remains as a reaming region after the bar has been displayed. Through the remaining region, the controller 180 can control additional information on a specific page to be outputted. For instance, the controller controls a remaining region to be represented in a specific color, thereby displaying additional information. Alternatively, the controller 180 outputs an indicator through a remaining region, thereby displaying additional information.

According to the example shown in FIG. 12A, by differentiating a color of a remaining region, a currently outputted page, a memo inserted page, a favorites-registered page and a bookmarked page are identifiably displayed.

The controller 180 may be able to display additional information by differentiating a color of each bar on a bar graph or displaying an indicator on each bar.

According to the example shown in FIG. 12B, by differentiating a color of a bar on a bar graph, a currently outputted page, a memo inserted page, a favorites-registered page and a bookmarked page are identifiably displayed.

If a specific bar is selected from a bar graph, the controller 180 can control a page or chapter information of a page indicated by the selected bar to be outputted. Moreover, if additional information is selected from the bar graph, the controller 180 can control the selected additional information to be outputted.

Figure 13A:
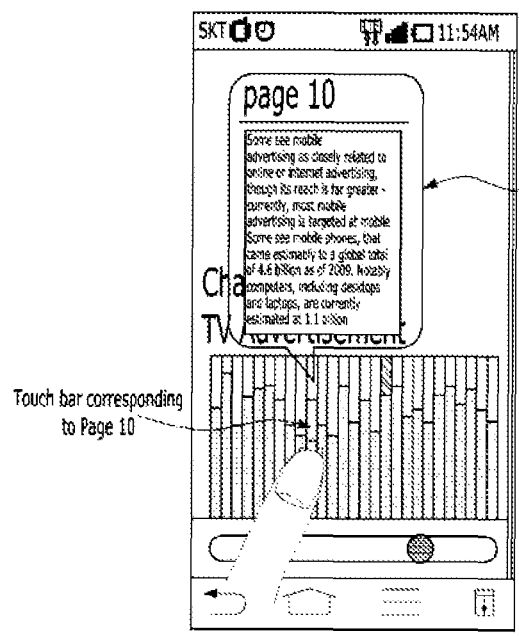
FIGS. 13A and 13B are diagrams for one example of an operation of a mobile terminal when a specific bar on a bar graph is touched.
Figure 13B:
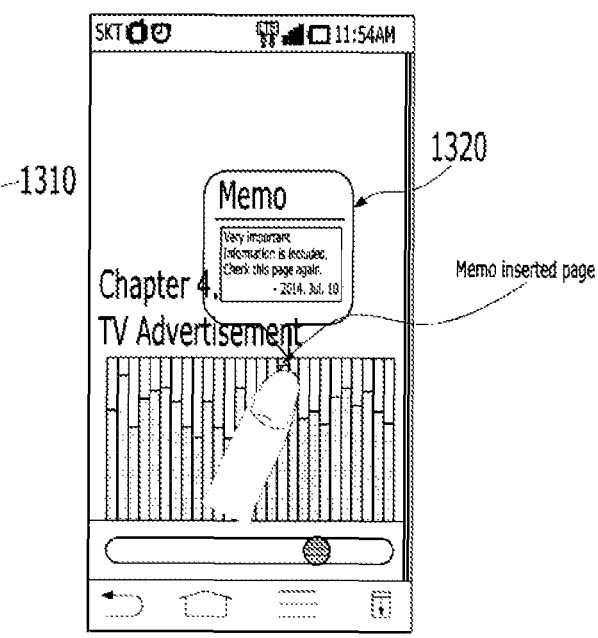

FIGS. 13A and 13B are diagrams for one example of an operation of a mobile terminal when a specific bar on a bar graph is touched.

Referring to FIGS. 13A and 13B, if a specific bar on a bar graph is touched, the controller 180 can control a page or chapter information of a page corresponding to the touched bar to be outputted.

According to the example shown in FIG. 13A, a page information 1310 of a page corresponding to a touched bar is outputted in response to a user input of touching a specific bar.

If an information indicating that a memo inserted page is identified is selected from additional information outputted through a remaining region of a bar graph, the controller 180 can control a memo inserted in the corresponding page to be outputted.

For instance, referring to FIG. 13B, if an information indicating that a memo inserted page is identified is touched, the controller 180 can control a memo 1320 inserted in the corresponding page to be outputted.

According to the examples of the above-described embodiments, a user's reading speed is measured by a unit of a single page and the measured reading speed is outputted through the display unit 151. For instance, if an e-book content is constructed with total 20 pages, the controller 180 can display a user's reading speed using maximum 20 bars.

If there is a considerable amount of an e-book content, it is difficult to display reading speeds for all pages on the display unit 151. For instance, in case that an e-book content is constructed with total 1,000 pages, since maximum 1,000 bars need to be displayed on the display unit 151, a bar width becomes narrow considerably so as to hamper user's visibility.

Therefore, the controller 180 may be able to measure a user's reading speed not by a unit of a single page but by a unit of a plurality of pages. For instance, if the unit pages include 10 pages, a single bar on a bar graph shown in FIGS. 11A to 11C may indicates a user's reading speed for 10 pages. In this case, the controller 180 can measure a user's reading speed based on the total number of words contained in the 10 pages and a time taken to read the 10 pages.

The unit pages may be adjusted by user's settings. Alternatively, the unit pages may be automatically determined in accordance with an amount of an e-book content. For instance, when maximum N reading speeds (i.e., N bars) are set to be outputted through the display unit 151, if an e-book content exceeds N pages, the controller 180 can determine 'round up (total page number of e-book content/N)' as the unit pages.

According to the examples of the above-described embodiments, a user's reading speed can be represented using a bar graph. On the other hand, the controller 180 can represent a user's reading speed using a graph of broken line.

While an e-book content is outputted, if a preset user input is received, the controller 180 outputs a title information of the e-book content or can control a lateral image to be outputted.

Figure 14A:
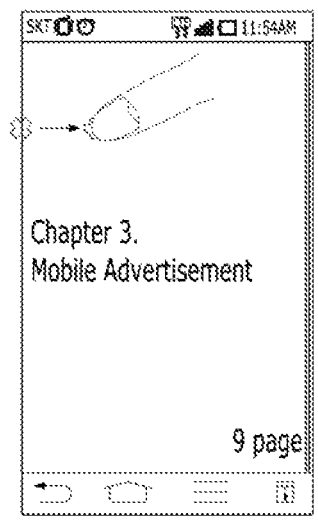
FIGS. 14A and 14B are diagrams for one example of outputting a title information.
Figure 14B:
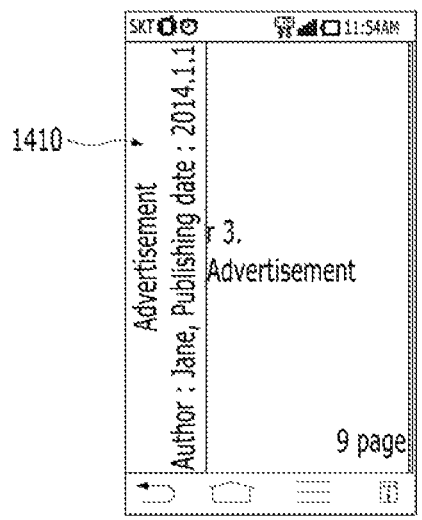

FIGS. 14A and 14B are diagrams for one example of outputting a title information.

Referring to FIGS. 14A and 14B, while an e-book content is outputted, if a preset user input (e.g., a user input of dragging a pointer to a right side from a left end of the display unit 151) is received [FIG. 14A], the controller 180 can control a title information 1410 of the e-book content to be outputted [FIG. 14B]. In this case, the title information of the e-book content may include information on at least one of a title of the e-book content, an author of the e-book content, a published day of the e-book content, and the like.

FIGS. 15A to 15C are diagrams for one example of outputting a lateral image.

Referring to FIGS. 15A to 15C, while a specific page of an e-book content is outputted, the controller 180 can control a lateral image 1510, which is configured with a stack of a plurality of pages, to be outputted. In this case, a width of the lateral image 1510 can be adjusted in accordance with a remaining amount behind the specific page. In particular, if the remaining amount behind the specific page increases more, the width of the lateral image 1510 can further increase.

In doing so, if a preset user input to the lateral image 1510 (e.g., a user input of dragging a pointer to a left side from a right end of the display unit 151) is received [FIG. 15A], the controller 180 can output an extended lateral image 1520 [FIG. 15B].

In doing so, if the touch to the display unit 151 is cancelled or a region for outputting the specific page is touched, the controller 180 can stop outputting the extended lateral image 1520.

A plurality of the pages contained in the lateral image 1520 may correspond to the entire pages of the e-book content or prescribed pages of the e-book content. For instance, the controller 180 can configure the lateral image 1520 with pages behind the currently outputted page.

Yet, in case that there is a considerable amount of the pages configuring the e-book content, it is difficult to display the entire pages through the lateral image 1520. Hence, the controller 180 controls a single page on the lateral image 1520 to represent a plurality of pages in accordance with the entire amount of the e-book content or a remaining amount behind a specific page or may control the lateral image 1520 to be configured with a prescribed portion of the remaining amount behind the specific page.

The controller 180 can control a part already read by a user and a part unread by a user yet in the entire amount of the e-book content to be displayed through the lateral image 1520 in a manner of being visually identifiable from each other.

According to the example shown in FIG. 15B, a part read by a user is represented in a first color and a part unread by a user is represented in a second color. The controller 180 can control the user-read part to be displayed in a manner of being subdivided by days or time slots. For instance, referring to FIG. 15C, a user-read part is identifiably displayed per time and day in which the user has read the corresponding part.

The controller 180 controls a time, which is taken for a user to read an e-book content so far, to be displayed on a user-read part and also controls a time, which is estimated to be taken for a user to read an unread part completely, to be outputted to the unread part.

If a drag input is applied to a lateral image, the controller 180 can control a page turning to be quickly performed from a page corresponding to a start point of the drag input to a page corresponding to an end point of the drag input. This enables a user to quickly glance over an e-book content.

Figure 16A:
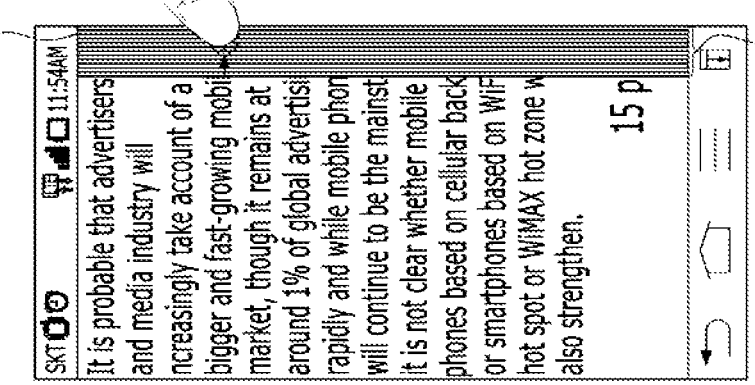
FIGS. 16A, 16B and 16C are diagrams for one example of performing a page turning from a start point of a drag input to an end point of the drag input in response to a user's drag input.
Figure 16B:
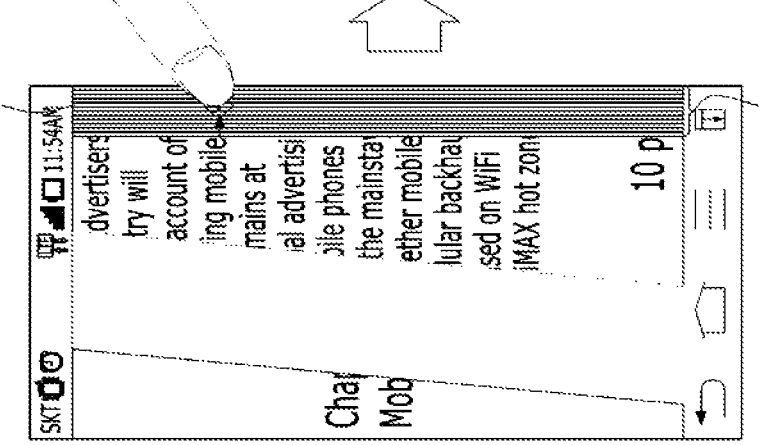
Figure 16C:
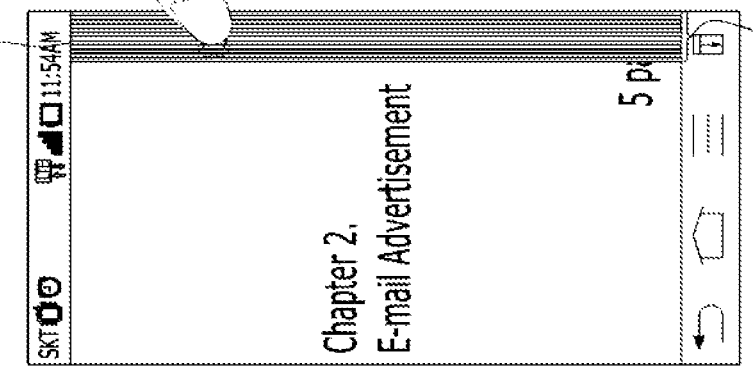

FIG. 16A to 16C are diagrams for one example of performing a page turning from a start point of a drag input to an end point of the drag input in response to a user's drag input. For clarity of the following description, assume that a user input in FIGS. 16A to 16C includes a touch input applied in a manner that a pointer touching a position corresponding to Page 5 on a lateral image 1610 is dragged to move to a position corresponding to Page 15.

In this case, the controller 180 can control a page turning to be quickly performed from Page 5 to Page 15. Like the example shown in FIGS. 16A to 16C, the controller 180 controls a page turning to be performed quickly and sequentially from Page 5 to Page 15, thereby enabling a user to glance over Pages 5 to 15.

The controller 180 can control a progress bar or a user's reading speed to be displayed through a lateral image. For instance, FIGS. 17A and 17B are diagrams for one example of displaying a progress bar or a bar graph indicating a user's reading speed on a size image.

Figure 17A:
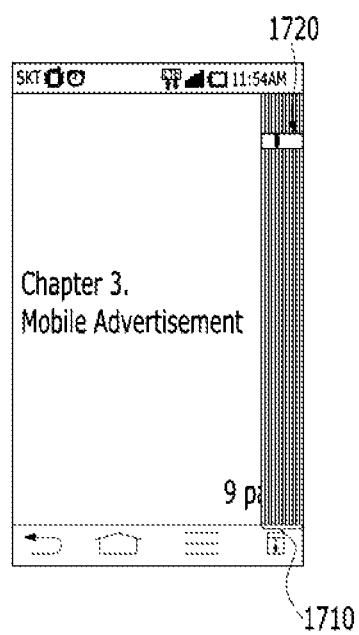
FIGS. 17A and 17B are diagrams for one example of displaying a progress bar or a bar graph indicating a user's reading speed on a size image.

Like the example shown in FIG. 17A, the controller 180 can control a progress bar 1720, which indicates a position of a currently outputted page in the entire amount of an e-book content, to be outputted to a lateral image 1710. In doing so, the controller 180 can set up a horizontal width of the progress bar 1720 to correspond to a horizontal width of the lateral image 1710. If a position of a position indicator on the progress bar 1720 is changed, the controller 180 may be able to control a page, which is outputted through the display unit 151, to be changed.

Figure 17B:
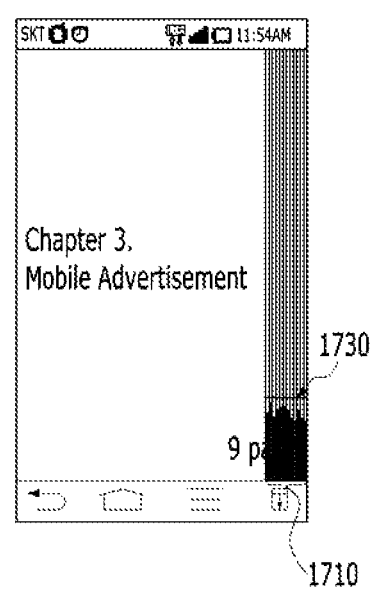

Like the example shown in FIG. 17B, the controller 180 can control a bar graph 1730, which indicates a reading speed per page, to be outputted to a lateral image 1710. In this case, each bar of the bar graph 1730 can indicate a user's reading speed for each page (or a plurality of pages) configuring the lateral image 1710.

The controller 180 can display additional information per page through the lateral image 1710. In particular, the controller 180 can control a memo inserted page, a favorites registered page, a bookmarked page, a currently outputted page and the like to be identifiably displayed on the lateral image 1710.

Figure 18:
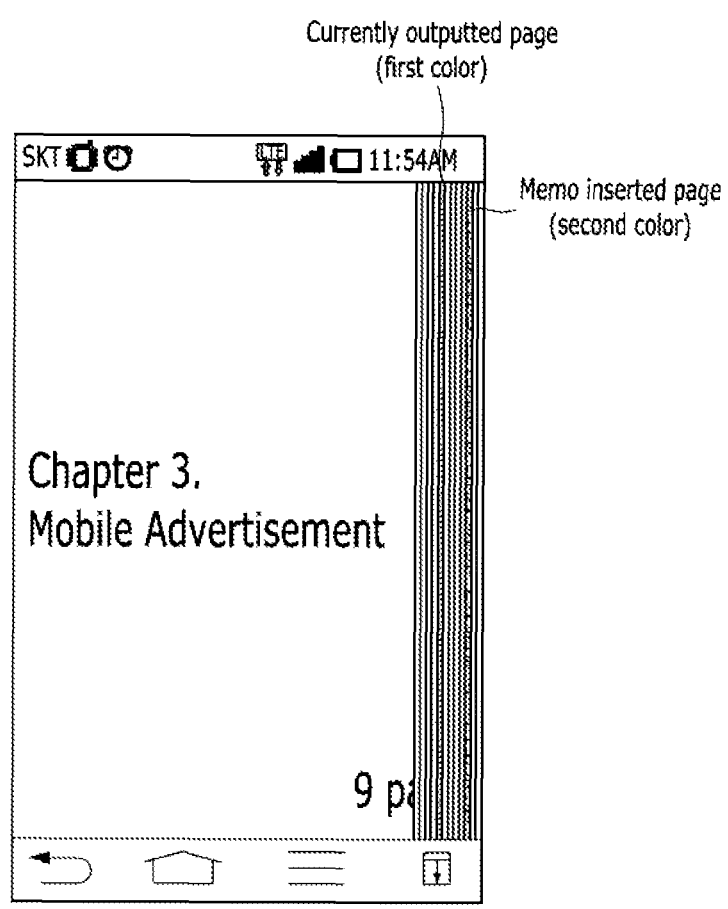
FIG. 18 is a diagram for one example of outputting additional information through a lateral image.

FIG. 18 is a diagram for one example of outputting additional information through a lateral image.

Like the example shown in FIG. 18, the controller 180 differentiates colors of a memo inserted page, a favorites registered page, a bookmarked page and a currently outputted page from each other on a lateral image, thereby controlling the enumerated pages to be visually identifiable from each other. According to the example shown in FIG. 18, a currently outputted page and a memo inserted page are displayed in a manner of being visually identifiable from each other.

While a specific page of an e-book content is outputted, if a user input of dragging a pointer in a prescribed direction is received, the controller 180 can change a currently outputted page.

Figure 19A:
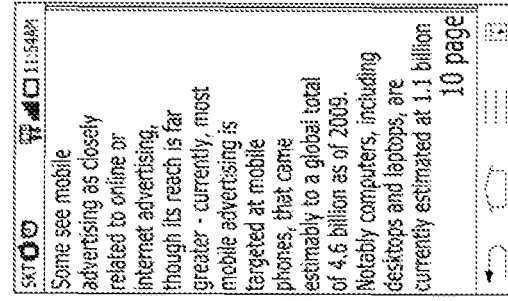
FIGS. 19A, 19B and 19C are diagrams for one example of changing a currently outputted page.
Figure 19B:
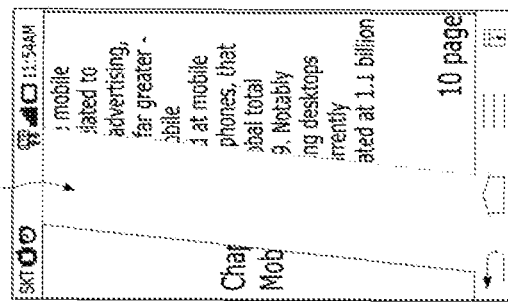
Figure 19C:
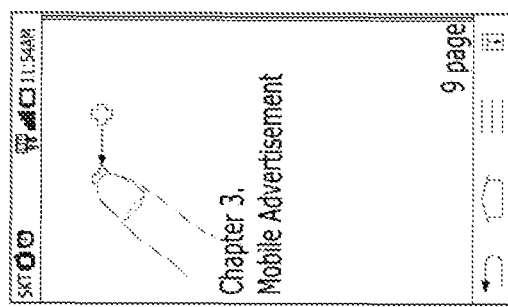

For instance, FIG. 19A to 19C are diagrams for one example of changing a currently outputted page.

Referring to FIGS. 19A to 19C, while a specific page of an e-book content is outputted, if a user input of dragging a pointer in a prescribed direction is received, the controller 180 can control a page next or previous to the specific page to be outputted through the display unit 151. For instance, if a pointer is dragged to move in a first direction, the controller 180 can control a page next to a specific page to be outputted. For another instance, if a pointer is dragged to move in a second direction, the controller 180 can control a page previous to a specific page to be outputted.

If a pointer touches the display unit 151 and is then dragged to move in a prescribed direction [FIG. 19A], the controller 180 can control a back side of a specific page to be outputted to give a visual effect as if turning a specific page of a real book [FIG. 19B].

In doing so, the controller 180 can control an information, which indicates whether a user read the specific page in the past, to be outputted to the back side of the specific page. For instance, if a user read the specific page already in the past, the controller 180 controls the back side of the specific page to be represented in a first color. On the other hand, if the user reads the specific page for the first time, the controller 180 can control the back side of the specific page to be represented in a second color.

The controller 180 can control a user's reading history for a specific page to be displayed on a back side of a specific page. In particular, the controller 180 can control at least one of a time taken for a user to read a specific page, a user's reading speed for the specific page, a date for a user to read the specific page in the past, and a count for a user to read the specific page to be outputted to the back side of the specific page.

The controller 180 can control information on a remaining amount behind a specific page to be displayed on a back side of the specific page. For instance, if a remaining amount behind the specific page gets larger, a color of the back side of the specific page can be represented in a color closer to a first color. For another instance, if a remaining amount behind the specific page gets smaller, a color of the back side of the specific page can be represented in a color closer to a second color. Moreover, the controller 180 displays a numeral (e.g., the number of remaining pages, a rate of a remaining amount, etc.) on the back side of the specific page, thereby displaying information on a remaining amount behind the specific page.

Thereafter, if a touch with a pointer having moved in a prescribed direction over a prescribed distance is cancelled, like the example shown in FIG. 19C, the controller 180 ends an output of the specific page and can control a page next or previous to the specific page to be outputted.

The mobile terminal 100 according to the present invention can adjust the number of pages, which are to be turned, in accordance with a position of a user's drag input for a page turning. For instance, if a user's drag input starts in one region of the display unit 151, the controller 180 controls a single page to be turned. If a user's drag input is applied to another region of the display unit 151, the controller 180 can control a plurality of pages to be turned.

FIGS. 20A to 20F are diagrams for examples of determining the number of pages to turn in response to a position of a drag input. For clarity of the following description, like the examples shown in FIG. 20A and FIG. 20D, assume that a first region I and a second region II are virtually included in the display unit 151.

Referring to FIGS. 20A to 20C, while a specific page is outputted, if a user input of dragging to move a pointer currently touching a first region I in a prescribed direction is received, the controller 180 can control a single page to be turned. For instance, referring to FIG. 20B and FIG. 20C, in response to a drag input to the first region I, a currently outputted page is changed into Page 10 from Page 9.

Figure 20F:
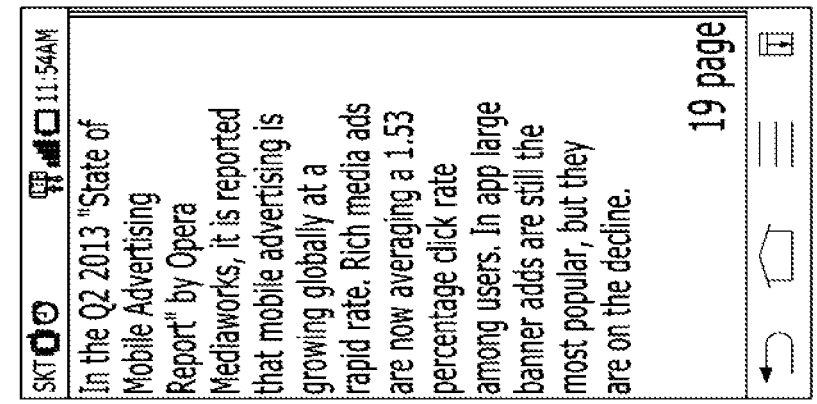
Figure 20E:
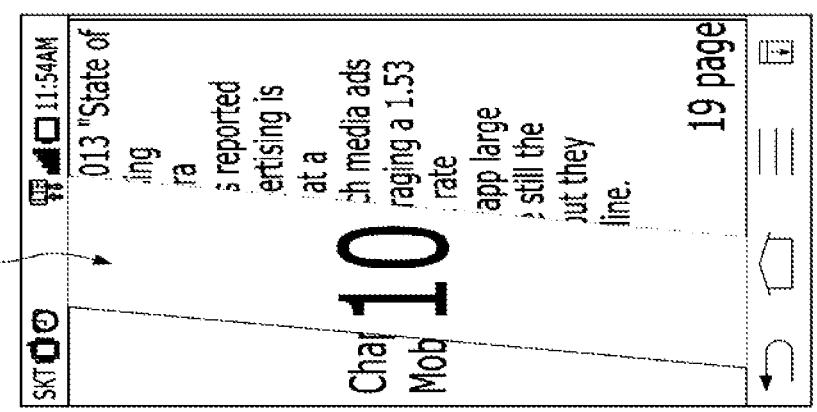
Figure 20D:
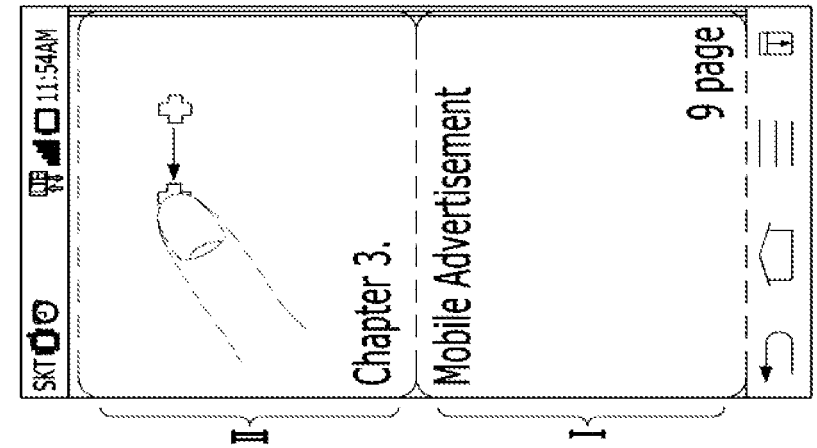

Referring to FIGS. 20D to 20F, while a specific page is outputted, if a user input of dragging to move a pointer currently touching a second region II in a prescribed direction is received, the controller 180 can control a plurality of pages to be turned at a time. For instance, referring to FIG. 20E and FIG. 20F, in response to a drag input to the second region II, a currently outputted page is changed into Page 19 from Page 9.

In doing so, the controller 180 may be able to control information, which is provided to identify the number of pages to be turned in response to a user input, to be outputted to a back side of the specific page. According to the example shown in FIG. 20B, a numeral '1' is displayed on the back side of the specific page to indicate that the number of pages to be turned is 1. According to the example shown in FIG. 20E, a numeral '10' is displayed on the back side of the specific page to indicate that the number of pages to be turned is 1. Unlike the examples shown in the drawings, the controller 180 can identifiably display the number of pages to be turned using a color of a back side of a specific page.

The controller 180 can determine the number of pages to turn in accordance with a preset value in response to a drag input of a pointer touching the second region II. For instance, if the preset value is 10 pages, the controller 180 can perform a page turning by a unit of 10 pages in response to a drag input of a pointer touching the second region II.

For another instance, the controller 180 can determine the number of pages to turn in accordance with a drag moving distance of a pointer touching the second region II. In particular, if a drag moving distance of a pointer touching the second region II is shorter than a first prescribed distance, the controller 180 can turn 10 pages at a time. If a drag moving distance of a pointer touching the second region II is longer than the first prescribed distance, the controller 180 can turn 20 pages at a time.

For another instance, the controller 180 can determine the number of pages to turn based on a drag moving speed of a pointer touching the second region II or a pressure generated from touching the display unit 151 with a pointer. In particular, if a drag moving speed of a pointer touching the second region II is smaller than a prescribed speed, the controller 180 can turn 10 pages at a time. If a drag moving speed of a pointer touching the second region II is equal to or greater than the prescribed speed, the controller 180 can turn 20 pages at a time. For another example, if a pressure applied to the display unit 151 by a pointer touching the second region II is smaller than a prescribed value, the controller 180 can turn 10 pages at a time in response to a drag input to the second region II. If a pressure applied by a pointer touching the second region II is equal to or greater than the prescribed value, the controller 180 can turn 20 pages at a time in response to a drag input to the second region II.

While an e-book content is displayed, the mobile terminal 100 according to the present invention can support various read modes including a read-only mode, a memo view mode, an edit mode and the like. The read-only mode may be provided to appreciate an e-book content only. The memo view mode may be provided to appreciate an e-book content and a memo inserted in the e-book content. And, the edit mode may be provided to insert a user-inputted object in an e-book content in a manner of underlining, inserting a memo, and the like in the course of appreciating an e-book content.

For instance, FIGS. 21A to 21G are diagrams to describe a read mode of a mobile terminal.

Figure 21A:
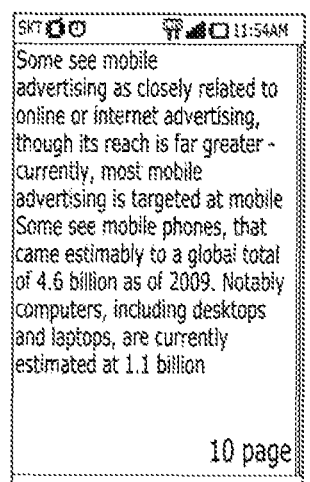

Referring to FIG. 21A, if the mobile terminal 100 is in read-only mode, the controller 180 can output a specific page of an e-book content only. In the read-only mode, a user may be able to appreciate the e-book content only.

Figure 21B:
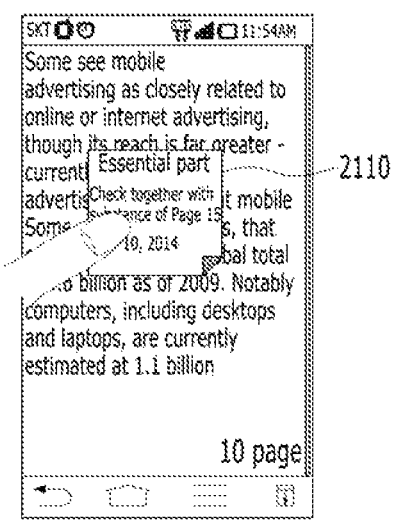
Figure 21C:
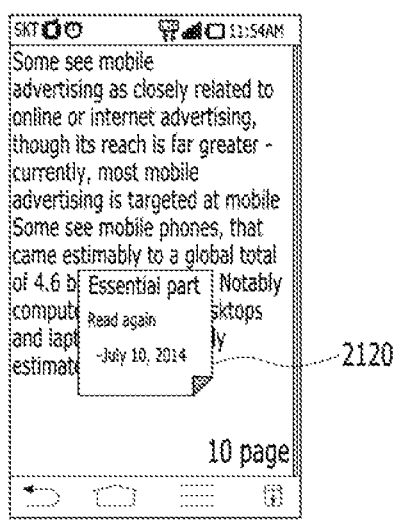

Referring to FIGS. 21B and 21C, if the mobile terminal 100 is in memo view mode, the controller 180 can control a specific page of an e-book content and a memo inserted in the specific page to be outputted. In the memo view mode, a user may be able to appreciate the e-book content and the memo inserted in the e-book content only.

In case that a plurality of memos are inserted in a specific page, the controller 180 can output a plurality of the memos entirely or can output a plurality of the memos sequentially. For instance, like the example shown in FIG. 21B, while a first memo 2110 inserted in the specific page is outputted, if a prescribed user input is received, like the example shown in FIG. 21C, the controller 180 can control a second memo 2120 inserted in the specific page to be outputted.

Figure 21D:
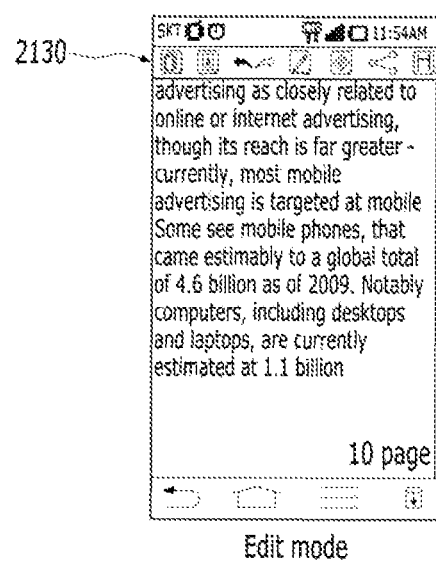

Referring to FIG. 21D, if the mobile terminal 100 is in edit mode, the controller 180 can control a specific page of an e-book content and menus for composing a memo, which is to be inserted in the specific page, to be outputted. Using the menus 2130, a user can underline the specific page, input a handwriting to the specific page, or insert a memo in the specific page.

The controller 180 can change a read mode of the mobile terminal 100 in response to a user input. For instance, referring to FIGS. 21E to 21G, while the mobile terminal 100 is operating in read-only mode, if a prescribed user input (e.g., a user input of dragging a left end of the display unit 151 in top-to-bottom direction, a user input of dragging a right end of the display unit 151 in top-to-bottom direction, etc.) is received [FIG. 21E], the controller 180 can control the mode of the mobile terminal 100 to be switched to a memo video mode or an edit mode [FIG. 21F, FIG. 21G]. The example of the user input shown in FIGS. 21E to 21G is provided for clarity of the description, by which the present invention is non-limited.

If the mobile terminal 100 is in read-only mode, a user is unable to check whether a memo is inserted in a specific page. Hence, the mobile terminal 100 according to the present invention can control an information, which indicates whether the memo is inserted in the specific page, to be outputted to a back side of the specific page.

FIGS. 22A to 22C are diagrams for one example of outputting information indicating whether a memo is inserted in a specific page to a back side of the specific page.

Referring to FIGS. 22A to 22C, if a user input of dragging to move a pointer touching a touchscreen in a prescribed direction is received, as mentioned in the foregoing description with reference to FIGS. 19A to 19C, a back side of a specific page can be outputted.

If a memo is not inserted in a specific page, like the example shown in FIG. 22A, the controller 180 can control a back side of the specific page to be represented in a first color. On the other hand, if a memo is inserted in the specific page, like the example shown in FIG. 22B, the controller 180 can control the back side of the specific page to be represented in a second color.

If a memo is inserted in a specific page, like the example shown in FIG. 22C, the controller 180 can control an indicator 2210, which indicates that the memo is inserted in the specific page, to be outputted to a back side of the specific page. In particular, the controller 180 may be able to output indicators 2210 as many as the number of memos inserted in a specific page. Moreover, the controller 180 can control a memo content inserted in the specific image to be outputted through the indicator 2210.

In response to a position of a user's drag input for a page turning, the mobile terminal 100 according to the present invention can turn a page by maintaining or changing a read mode. For instance, if a user drag input starts within one region of the display unit 151, the controller 180 can turn a page by maintaining a read mode. For another instance, if a user drag input starts within another region of the display unit 151, the controller 180 can turn a page by changing a read mode.

FIGS. 23A to 23F are diagrams for examples of turning a page by maintaining or changing a read mode in response to a position of a drag input. For clarity of the following description, like the examples shown in FIG. 23A and FIG. 23D, assume that a first region I and a second region II are virtually included in the display unit 151. And, assume that the mobile terminal 100 is operating in read-only mode.

Figure 23A:
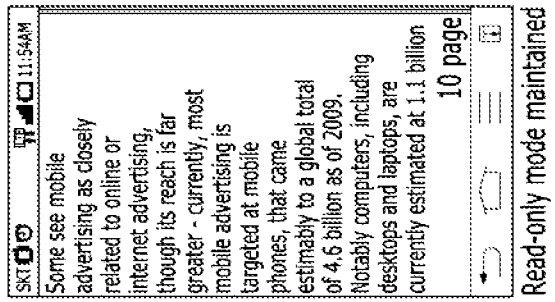
FIGS. 23A, 23B, 23C, 23D, 23E and 23F are diagrams for examples of turning a page by maintaining or changing a read mode in response to a position of a drag input.
Figure 23B:
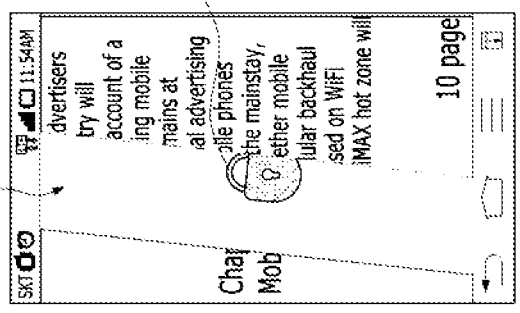
Figure 23C:
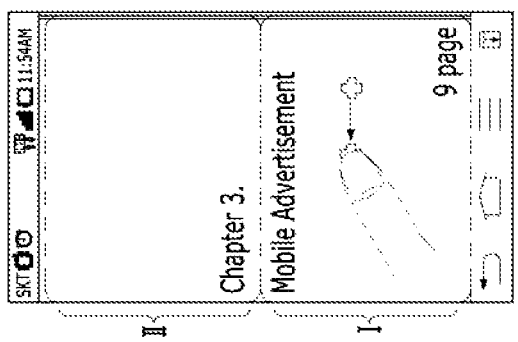

Referring to FIGS. 23A to 23C, while a specific page is outputted, if a user input of dragging to move a pointer currently touching a first region I in a prescribed direction is received, the controller 180 is able to turn a page by maintaining a current read mode (i.e., read-only mode) [FIG. 23B and FIG. 23C].

Figure 23D:
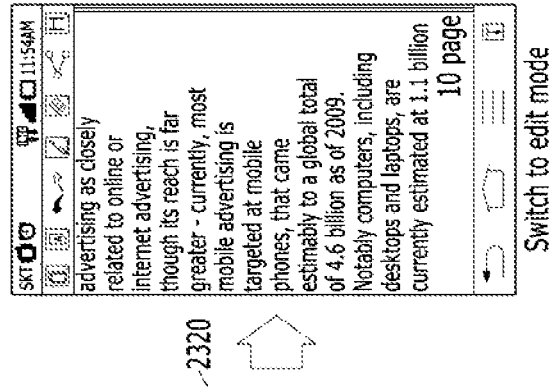
Figure 23E:
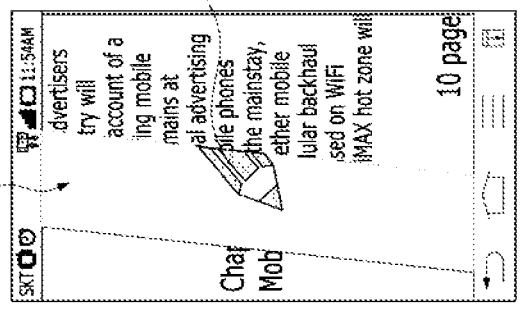
Figure 23F:
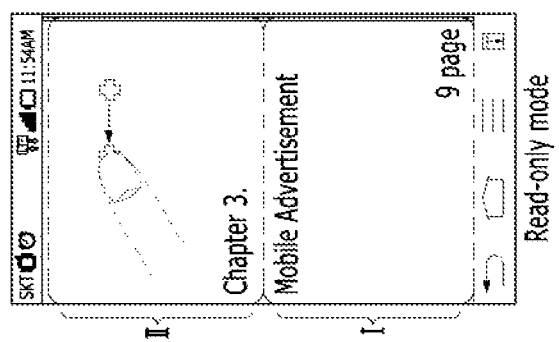

Referring to FIGS. 23D to 23F, while a specific page is outputted, if a user input of dragging to move a pointer currently touching a second region II in a prescribed direction is received, the controller 180 is able to turn a page by changing a read mode. For instance, referring to FIG. 23E and FIG. 23F, the read mode of the mobile terminal 100 is changed into an edit mode from a read-only mode as a current page is turned to a next page.

In doing so, the controller 180 can control an information, which indicates the read mode maintained or changed, to be outputted to a back side of the specific page. For instance, according to the example shown in FIG. 23B, an indicator 2310 indicating that the read-only mode is maintained is outputted to the back side of the specific page. For another instance, according to the example shown in FIG. 23E, an indicator 2320 indicating that the current mode will be changed into the edit mode is maintained is outputted to the back side of the specific page.

FIGS. 23D to 23F show one example that the read mode is changed into the edit mode from the read-only mode in response to the drag input to the second region II. Yet, unlike the example, a read mode can be changed into a memo view mode from a read-only mode.

Moreover, the controller 180 can virtually partition the display unit 151 into a first region, a second region and a third region [not shown in the drawing]. In this case, the controller 180 can turn a page by maintaining a read mode of the mobile terminal 100 in response to a user input to the first region and is also able to turn a page by changing the read mode of the mobile terminal 100 in response to a user input to the second region or the third region. In particular, the controller 180 may be able to control the read mode to be changed into a different read mode in response to a user input to the second region or the third region. For instance, in case of receiving a user input to the second region, the controller 180 can control the read mode to be changed into an edit mode. For another instance, in case of receiving a user input to the third region, the controller 180 can control the read mode to be changed into a memo view mode.

Combination of the embodiments described with reference to FIGS. 20A to 20F, and FIGS. 23A to 23F can apply to the mobile terminal 100 according to the present invention. For instance, FIGS. 24A to 24D are diagrams for one example of applying combination of the former embodiments described with reference to FIGS. 20A to 20F and FIGS. 23A to 23F. For clarity of the following description, like the examples shown in FIG. 24A, assume that a first region I, a second region II and a third region III are virtually included in the display unit 151.

Referring to FIGS. 24A to 24D, if a drag input is received through a first region I, like the example shown in FIG. 24B, the controller 180 can turn a single page without changing a read mode.

If a drag input is received through a second region II, like the example shown in FIG. 24C, the controller 180 can turn a plurality of pages at a time without changing a read mode.

If a drag input is received through a third region III, like the example shown in FIG. 24D, the controller 180 can turn a single page by changing a read mode.

In particular, if a drag input is received through the first region I or the third region III, the controller 180 turns a single page. Yet, if a drag input is received through the second region II, the controller 180 can turn a plurality of pages at a time. Moreover, if a drag input is received through the first region I or the second region II, the controller 180 maintains a read mode. Yet, if a drag input is received through the third region III, the controller 180 can change the read mode.

According to the embodiments mentioned in the above descriptions, if a user input of dragging to move a pointer currently touching the display unit 151 in a prescribed direction is received, a page turning operation can be performed in response to the received user input.

While a specific page is outputted, if a drag input in a direction (e.g., a direction orthogonal to the prescribed direction, etc.) different from the prescribed direction is received, the controller 180 can control a page linked to the specific page to be outputted. In this case, the page linked to the specific page can be set by an e-book content manufacturer or can be manually set by a user input. For instance, if a specific page contains a problem, a page containing a solution for the corresponding problem can be set as a linked page for the specific page. Moreover, if a specific page contains a text string indicating a specific position on an e-book content, a page indicated by the corresponding text string can be set as a linked page for the specific page. If a specific page contains a specific terminology, a page describing the corresponding terminology can be set as a linked page for the specific page. If a specific page contains a footnote, a page containing a description of the corresponding footnote can be set as a linked page for the specific page.

FIGS. 25A to 25D are diagrams to describe an operation of a mobile terminal in response to a direction of a drag input. For clarity of the following description, assume that Page 10 is currently outputted through the display unit 151. And, assume that a page linked to the Page 10 is Page 19.

Figure 25A:
FIGS. 25A, 25B, 25C and 25D are diagrams to describe an operation of a mobile terminal in response to a direction of a drag input.
Figure 25B:
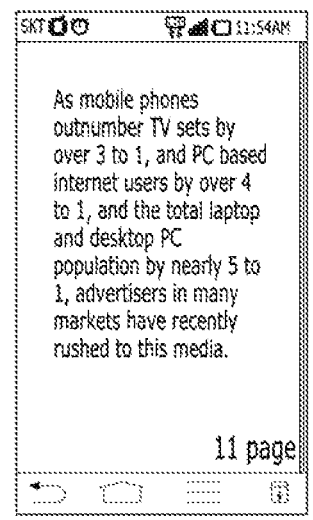

Referring to FIGS. 25A and 25B, while a specific page is outputted, if a drag input in a first direction is received (e.g., a pointer touching the display unit 151 is dragged to move in a left or right direction) [FIG. 25A], the controller 180 can control a page next (or previous) to the specific page to be outputted [FIG. 25B].

Figure 25C:
Figure 25D:
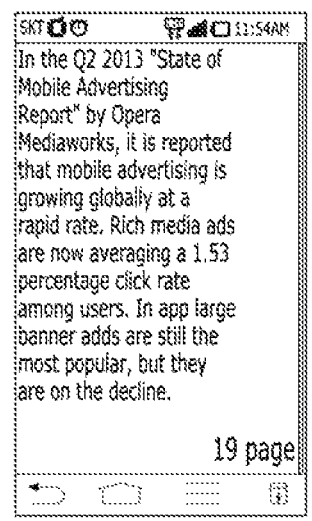

Referring to FIGS. 25C and 25D, while a specific page is outputted, if a drag input in a second direction is received (e.g., a pointer touching the display unit 151 is dragged to move in a top or bottom direction) [FIG. 25C], the controller 180 can control a page linked to the specific page to be outputted [FIG. 25D].

Besides, while the linked page is outputted, if a drag input in a direction opposite to the second direction is received, the controller 180 may be able to control the specific page to be outputted again [not shown in the drawing].

An e-book content may contain a blank page having nothing written thereon when a chapter is changed. Moreover, an e-book content may contain a blank page having nothing written thereon in a last page. Since no information is written on the blank page, a user is unable to confirm whether the blank page means a last page of the e-book content. Hence, when a blank page is outputted, the mobile terminal 100 according to the present invention can control a content of a page, which is not a last page of an e-book content but is a page next to the blank page, to be blurredly displayed through the blank page. Therefore, the user is able to check whether the blank page is the last page of the e-book content.

In order to perform such an editing action as an action of copying a content contained in an e-book content, an action of underlining a prescribed substance contained in the e-book content, an action of changing a color of a prescribed substance contained in the e-book content and the like, a user is able to select a text contained in the e-book content. In doing so, while the user selects a last located text of a specific page, if a prescribed user input is applied, the controller 180 can control the text contained in a next page to be automatically selected.

Figure 26A:
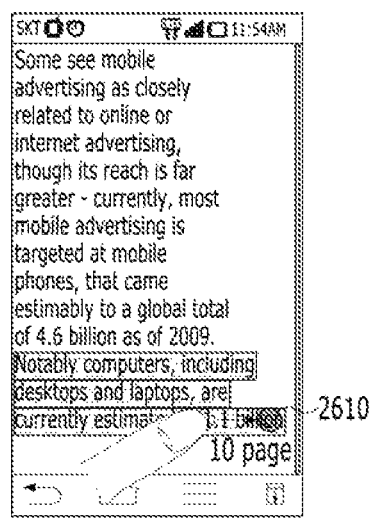
FIGS. 26A and 26B are diagrams for one example of automatically selecting a text on a next page by a user input.
Figure 26B:
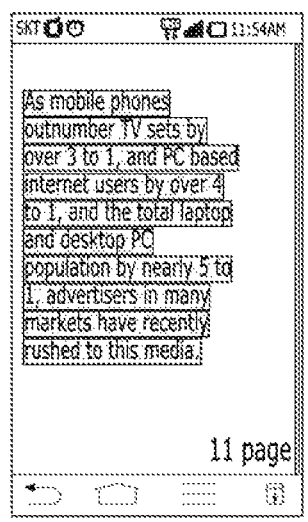

For instance, FIGS. 26A and 26B are diagrams for one example of automatically selecting a text on a next page by a user input.

Referring to FIGS. 26A and 26B, while a specific page is outputted, a user is able to select a text contained in a specific page through a touch input. In doing so, a user input for selecting a text may include an action of long touching a prescribed point with a pointer (i.e., touching the prescribed point over prescribed duration, etc.) and then dragging the pointer, by which the user input is non-limited.

In this case, if a last located text of the specific page is selected, like the example shown in FIG. 26A, the controller 180 can control an indicator 2610, which leads a selection of a text contained in a next page, to be outputted. If the indicator 2610 is touched, like the example shown in FIG. 26B, the controller 180 changes the page and is also able to control the text contained in the next page to be automatically selected.

Accordingly, embodiments of the present invention provide various effects and/or features.

First of all, the present invention provides a mobile terminal and controlling method thereof, by which user's convenience can be enhanced.

In particular, the present invention provides a mobile terminal and controlling method thereof, by which information on an unappreciated portion of an e-book content, information on a time taken to completely read the unappreciated portion and the like can be provided.

And, the present invention provides a mobile terminal and controlling method thereof, by which essential information of each page can be displayed.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display configured to display contents of an e-book; and
a controller configured to:

cause the display to display a progress bar on a page of the e-book in response to an input received while the page is displayed,
the progress bar indicating a position of the displayed page among total pages of the e-book,
the progress bar comprising reading pattern information associated with at least one page of the e-book, and
the reading pattern information comprising information related to a reading speed determined based on a number of pages of the e-book accessed and a duration of accessing the pages for reading; and
cause the display to display an estimated time to read a remaining portion of the e-book, wherein the estimated time is determined based on the reading speed and a number of pages of the remaining portion of the e-book.

2. The mobile terminal of claim 1, wherein the controller is further configured to cause the display to display at least one color indicator in the progress bar, the at least one color indicator corresponding to the reading speed such that various colors corresponding to various speeds are displayable in the progress bar when the various speeds are determined for different pages of the e-book.

3. The mobile terminal of claim 1, wherein the controller is further configured to cause the display to display:
a position indicator on the progress bar, the position indicator indicating a position of the currently displayed page among the total pages of the e-book; and
the information related to the reading speed within the position indicator.

4. The mobile terminal of claim 1, wherein the controller is further configured to cause the display to display a ratio of read and unread pages of the e-book via the progress bar.

5. The mobile terminal of claim 4, wherein the controller is further configured to cause the display to display:
a movable position indicator on the progress bar, the position indicator indicating a position of the currently displayed page among the total pages of the e-book;
an amount of the read pages on one side of the progress bar with respect to the position indicator; and
an amount of the unread pages on the other side of the progress bar with respect to the position indicator.

6. The mobile terminal of claim 1, wherein the controller is further configured to cause the display to display the estimated time within the progress bar.

7. The mobile terminal of claim 1, wherein the display comprises a touch screen and the controller is further configured to cause the display to display specific information in response to a first touch input received via the progress bar, the specific information determined based on a location of the progress bar on which the first touch input is received such that the specific information relates to page information of a page corresponding to the location of the progress bar or chapter information of a chapter corresponding to the location of the progress bar.

8. The mobile terminal of claim 7, wherein the controller is further configured to cause the display to display the page corresponding to the location of the progress bar in response to a second touch input received via the displayed specific information.

9. The mobile terminal of claim 7, wherein the controller is configured to cause the display to display a first page of the chapter corresponding to the location of the progress bar in response to a second touch input received via the displayed specific information.

10. The mobile terminal of claim 1, wherein the display comprises a touch screen and the controller is further configured to cause the display to display a next or previous page in response to a first drag input received on the displayed page based on a first direction of the first drag input.

11. The mobile terminal of claim 10, wherein the controller is further configured to cause the display to display:
a back side of the page being turned to display the next or previous page; and
specific reading information associated with the page on the back side of the page being turned.

12. The mobile terminal of claim 11, wherein the specific reading information comprises at least the reading speed associated with the page, a duration of time the page was displayed, or a day on which the page was read.

13. The mobile terminal of claim 11, wherein the back side of the page is represented in a first color if the page has been read previously and the back side of the page is represented in a second color that is different from the first color if the page has been read for the first time.

14. The mobile terminal of claim 11, wherein the controller is further configured to cause the display to display a memo associated with the page on the back side of the page being turned.

15. The mobile terminal of claim 10, wherein the controller is further configured to cause the display to display another page linked to the page in response to a second drag input received instead of the first drag input, the second drag input received in a second direction that is orthogonal to the first direction.

16. The mobile terminal of claim 1, wherein the controller is further configured to cause the display to display remaining time estimated for finishing reading of the displayed page via the progress bar.

17. The mobile terminal of claim 16, wherein the controller is further configured to cause the display to display:
a position indicator on the progress bar, the position indicator indicating a position of the currently displayed page among the total pages of the e-book; and
the remaining time within the position indicator.

18. The mobile terminal of claim 1, wherein the controller is further configured to cause the display to display a graph on which reading speeds of read pages of the e-book are plotted.

19. A method for controlling a mobile terminal, comprising:
displaying a page of an e-book;
displaying a progress bar in response to an input received while the page is displayed,
wherein the progress bar indicates a position of the displayed page among total pages of the e-book,
the progress bar comprises reading pattern information associated with at least one page of the e-book, and
the reading pattern information comprises information related to a reading speed determined based on a number of pages of the e-book accessed and a duration of accessing the pages for reading; and
displaying an estimated time to read a remaining portion of the e-book, wherein the estimated time is determined based on the reading speed and a number of pages of the remaining portion of the e-book.

* * * * *